(12) United States Patent
Mani et al.

(10) Patent No.: US 12,118,151 B2
(45) Date of Patent: *Oct. 15, 2024

(54) HAPTIC FEEDBACK DEVICE AND METHOD FOR PROVIDING HAPTIC SENSATION BASED ON VIDEO

(71) Applicants: Niki Mani, La Jolla, CA (US); Alex Hamid Mani, LaJolla, CA (US)

(72) Inventors: Niki Mani, La Jolla, CA (US); Alex Hamid Mani, LaJolla, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,013

(22) Filed: Oct. 4, 2023

(65) Prior Publication Data
US 2024/0028125 A1 Jan. 25, 2024

Related U.S. Application Data

(63) Continuation of application No. 18/148,584, filed on Dec. 30, 2022, now Pat. No. 11,782,510, which is a
(Continued)

(51) Int. Cl.
*G06F 3/01* (2006.01)
*A63F 13/285* (2014.01)
(Continued)

(52) U.S. Cl.
CPC ............ *G06F 3/016* (2013.01); *A63F 13/285* (2014.09); *G09B 21/00* (2013.01); *G09B 21/003* (2013.01);
(Continued)

(58) Field of Classification Search
CPC ......... G06F 3/016; G06F 3/011; G09B 21/00; G09B 21/003; G09B 21/007;
(Continued)

(56) References Cited

U.S. PATENT DOCUMENTS 8,410,916 B1 4/2013 Camoriano Gladson et al.
9,635,440 B2 * 4/2017 Lacroix ............. H04N 21/8133
(Continued)

OTHER PUBLICATIONS

Notice of Allowance for U.S. Appl. No. 17/037,408 dated Oct. 12, 2023.
Non-Final Office Action for U.S. Appl. No. 18/334,519 dated Feb. 29, 2024.
(Continued)

*Primary Examiner* — Ricardo Osorio
(74) *Attorney, Agent, or Firm* — CHIP LAW GROUP

(57) ABSTRACT

A device for providing haptic sensation includes a haptic feedback interface. A plurality of videos each recording a real time or near-real time event in a three-dimensional real-world area from a different viewing angle is received and a user input via a mode selector in form of a gesture or a physical touch input is received to indicate a selection of an image-capture device is received. A plurality of different motion of a plurality of objects in an upcoming scene of a captured video is detected based on a look-ahead buffer of the video. A plurality of different haptic cues that includes the one or more movable haptic cues is generated based on the determined haptic feedback. Further, movement of the one or more movable haptic cues is controlled on the haptic feedback interface such that an inter-movement among the plurality of objects is discernible by tactioception.

20 Claims, 8 Drawing Sheets

Related U.S. Application Data continuation of application No. 17/646,738, filed on Jan. 3, 2022, now Pat. No. 11,561,619, which is a continuation-in-part of application No. 17/460,460, filed on Aug. 30, 2021, now Pat. No. 11,455,041, which is a continuation of application No. 16/927,091, filed on Jul. 13, 2020, now Pat. No. 11,175,740, which is a continuation of application No. 16/600,636, filed on Oct. 14, 2019, now Pat. No. 10,754,429, which is a continuation of application No. 16/298,016, filed on Mar. 11, 2019, now Pat. No. 10,496,176, which is a continuation of application No. 15/709,985, filed on Sep. 20, 2017, now Pat. No. 10,281,983.

(51) Int. Cl.
  *G09B 21/00*    (2006.01)
  *H04N 21/422*   (2011.01)
  *H04N 5/14*     (2006.01)

(52) U.S. Cl.
  CPC ....... *H04N 21/42204* (2013.01); *H04N 5/144* (2013.01)

(58) Field of Classification Search
  CPC ............. H04N 21/42204; H04N 5/144; H04N 21/44008; A63F 13/285
  See application file for complete search history.

(56) References Cited

U.S. PATENT DOCUMENTS

| | | | |
|---|---|---|---|
| 10,281,943 B1* | 5/2019 | Ho | G05F 1/575 |
| 11,561,619 B2* | 1/2023 | Mani | G09B 21/007 |
| 11,726,571 B2 | 8/2023 | Mani et al. | |
| 11,782,510 B2* | 10/2023 | Mani | G09B 21/007 345/156 |
| 2013/0038756 A1 | 2/2013 | Cheng | |
| 2015/0253851 A1* | 9/2015 | Oh | G06F 3/04883 345/179 |
| 2016/0018920 A1* | 1/2016 | Deokar | G06F 3/016 345/174 |
| 2016/0184703 A1* | 6/2016 | Brav | A63F 13/213 463/30 |
| 2017/0024010 A1 | 1/2017 | Weinraub | |
| 2018/0112978 A1* | 4/2018 | Burton | G01C 11/025 |
| 2018/0189567 A1* | 7/2018 | Maheriya | G09B 21/007 |
| 2019/0276051 A1* | 9/2019 | Marti | H04R 1/46 |

OTHER PUBLICATIONS

Non-Final Office Action for U.S. Appl. No. 18/469,933 dated Apr. 10, 2024.
Notice of Allowance for U.S. Appl. No. 18/334,519 dated Jul. 9, 2024.
Notice of Allowance for U.S. Appl. No. 18/469,933 dated Aug. 29, 2024.

* cited by examiner

HAPTIC FEEDBACK DEVICE AND METHOD FOR PROVIDING HAPTIC SENSATION BASED ON VIDEO

CROSS-REFERENCE TO RELATED APPLICATIONS/INCORPORATION BY REFERENCE

This Patent Application makes reference to, claims priority to, claims benefit of, and is a Continuation Application of U.S. patent application Ser. No. 18/148,584, filed Dec. 30, 2022, which is a Continuation Application of U.S. Pat. No. 11,561,619, granted Jan. 24, 2023, a continuation-in-part Application of U.S. Pat. No. 11,455,041, granted Sep. 27, 2022, which is a Continuation Application of U.S. Pat. No. 11,175,740, granted Nov. 16, 2021, which is a Continuation Application of U.S. Pat. No. 10,754,429, which is a Continuation Application of U.S. Pat. No. 10,496,176, granted Dec. 3, 2019, which is a Continuation Application of U.S. Pat. No. 10,281,983, granted May 7, 2019.

FIELD

Various embodiments of the disclosure relate to haptic technologies. More specifically, various embodiments of the disclosure relate to a haptic feedback device and method to provide haptic sensation based on video.

BACKGROUND

Humans have five traditional recognized senses, sight (ophthalmoception), hearing (audioception), taste (gustaoception), smell (olfacoception or olfacception), and touch (tactioception). The loss of one or more senses generally results in enhancement of one or more of the remaining senses to compensate for the lost sense(s). Currently, technological developments in human-machine interaction (HMI) are mostly focused on vision-based interaction technology. Touch-sense based technologies still remains under-explored. For example, existing technology are typically focused on Braille-based or other rudimentary forms of tactile presentation systems, such as raised dots or spikes. It is known that the sense of touch has a much greater sensory resolution than the sense of sight. Hence, the sense of touch can detect even small changes on a surface that the eye cannot detect. Thus, a technologically advanced haptic feedback device may be required to provide enhanced haptic sensation to a user to improve user experience, for example, in entertainment, real time experience, and overall understanding of the world by extended exploration of the human touch-sense.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A haptic feedback device and a method to provide haptic sensation based on video substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed haptic feedback device and method for providing haptic sensation. The disclosed haptic feedback device provides enhanced haptic sensation to a user to improve the user experience, for example, as a spectator in real time sports games, as a passenger in a vehicle, and overall understanding of the world. The disclosed haptic feedback device harnesses the non-visual senses, such as the sense of touch and hearing, to provide enhanced haptic sensation to users to provide enhanced user experience by exploring the touch-sense of the users. In some embodiments, the haptic feedback device may be used by users are visually impaired. In some embodiments, the haptic feedback device may also be used by sighted people to gain unfamiliar and supplementary experiences by exploring their touch-sense in extended manner in additional to the visual sense.

Figure 1:
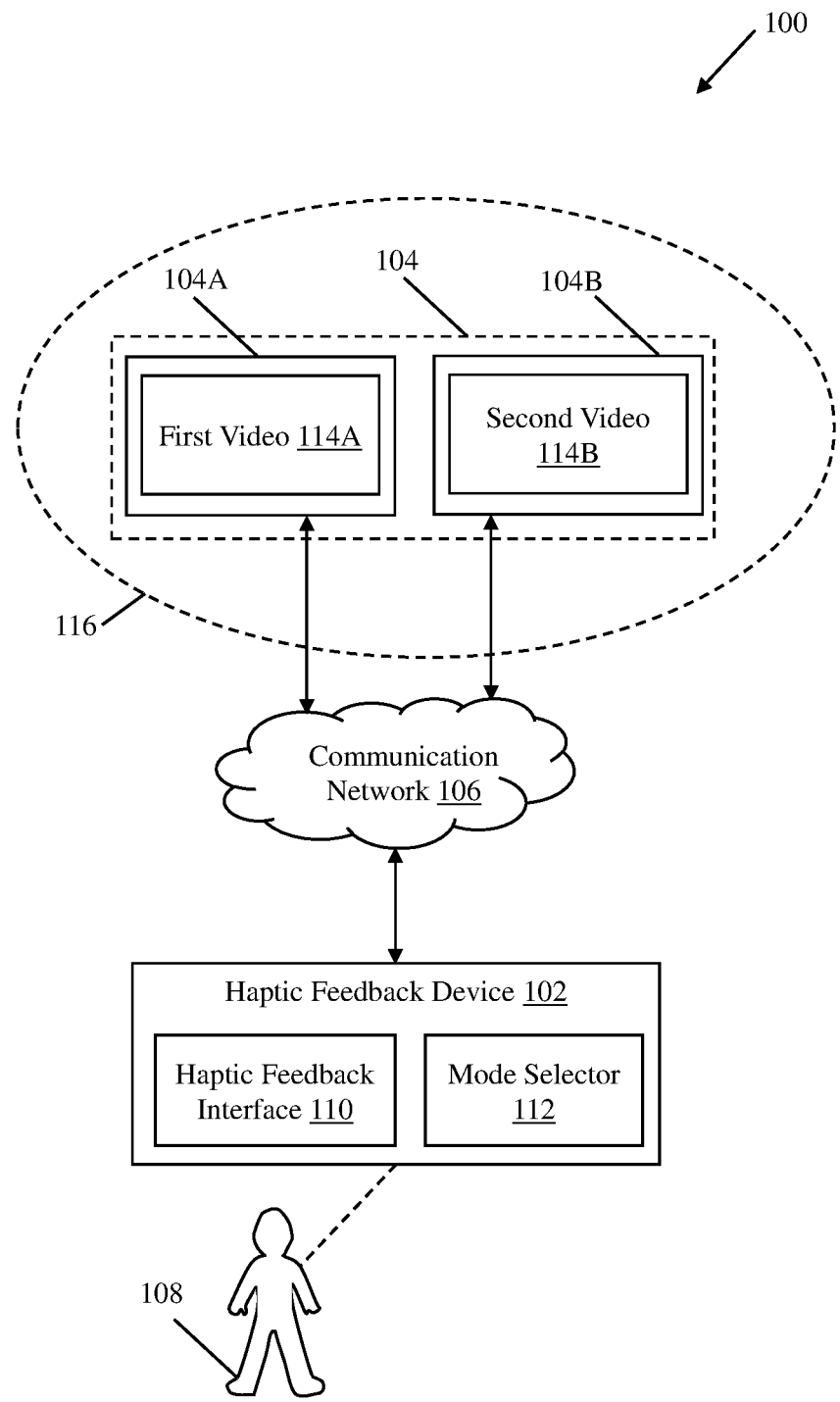
FIG. 1 illustrates an exemplary environment for providing haptic sensation by a haptic feedback device based on video, in accordance with an embodiment of the disclosure.

FIG. 1 illustrates an exemplary environment for providing haptic sensation by a haptic feedback device based on video, in accordance with an embodiment of the disclosure. With reference to FIG. 1, there is shown an exemplary environment 100. The exemplary environment 100 may include a haptic feedback device 102, a plurality of image-capture devices 104, such as a first image-capture device 104A and a second image-capture device 104B, a communication network 106, and one or more users, such as a user 108. The haptic feedback device 102 may include a haptic feedback interface 110 and a mode selector 112. The first image-capture device 104A and the second image-capture device 104B may capture videos such as a first video 114A and a second video 114B, respectively, to record real time or near-real time events in a three-dimensional (3D) real-world area 116. The haptic feedback device 102 may be communicatively coupled to the plurality of image-capture devices 104 via the communication network 106.

The haptic feedback device 102 may include suitable logic, circuitry, and/or code to generate a plurality of different haptic cues on the haptic feedback interface 110. The plurality of different haptic cues may be generated based on the first video 114A and/or the second video 114B captured by the plurality of image-capture devices 104 (such as the first image-capture device 104A and/or the second image-capture device 104B). Examples of implementation of the haptic feedback device 102 may include, but are not limited to a special-purpose portable haptic feedback device, special-purpose hand gloves, special-purpose shoes, or a wearable device that may be worn at different parts of human body.

The plurality of image-capture devices 104 (e.g., the first image-capture device 104A and the second image-capture device 104B) may include suitable logic, circuitry, and/or code that may be configured to capture a real time or near-real time video (e.g., the first video 114A and/or the second video 114B) to record a real time or near-real time event in the 3D real-world area 116. In an embodiment, the plurality of image-capture devices 104 may have a different field of view and capture the real time or near-real time event from different angular orientations, for example, different viewing angles. For example, the first image-capture device 104A may have a field of view to capture a top view of the real time or near-real time event and the second image-capture device 104B may have a different field of view to capture a side view (e.g., a left side or a right side) of the real time or near-real time event. In other words, the first video 114A may correspond to the top view of the real time or near-real time event and the second video 114B may correspond to the side view of the real time or near-real time event. Examples of the plurality of image-capture devices 104 may include, but are not limited to a video recording camera, a 3D camcorder, a smartphone camera, a webcam, a smartphone camera, or other image-capture devices.

The communication network 106 may be a medium that may enable communication between the haptic feedback device 102 and the plurality of image-capture devices 104. The communication network 106 may be implemented by one or more wired or wireless communication technologies known in the art. In some embodiments, the communication network 106 may refer to a short-range or medium-range wireless communication network. In some embodiments, the communication network 106 may refer to a long range communication network. Examples of short-range or medium-range wireless communication networks may include, but are not be limited to, a Wireless-Fidelity based network, a Light-Fidelity (Li-Fi) based network, a wireless personal area network (WPAN) such as a BLUETOOTH™ network, Internet-of-Things (IoT) network, Machine-Type-Communication (MTC) network, and/or a Wi-Max based network. Examples of the long range communication networks may include, but not limited to, the Internet, a cloud network, a wireless wide area network (WWAN), a Local Area Network (LAN), a plain old telephone service (POTS), a Metropolitan Area Network (MAN), or a cellular or mobile network, such as Global System for Mobile Communications (GSM), General Packet Radio Service (GPRS), Enhanced Data Rates for GSM Evolution (EDGE), 1G, 2G, 3G, 4G Long Term Evolution (LTE), 5G, IEEE 802.11, 802.16, and the like.

The haptic feedback interface 110 may comprise a plurality of haptic elements. In accordance with an embodiment, the haptic feedback interface 110 may refer to a haptic output interface configured to provide at least a touch-discernible output to the user 108. In some embodiments, the haptic feedback interface 110 may refer to a haptic input/ output (I/O) interface configured to receive haptic input as well as provide haptic output to the user 108 from the same haptic I/O interface. It is known that the sense of touch has a much greater sensory resolution than the sense of sight. Hence, the sense of touch can detect even small changes on a surface that the eye cannot detect. This principle of the sense of touch may be used to guide the design of the haptic feedback interface 110.

In some embodiments, the user 108 may be a person who have lost or impaired the sense of sight. The user 108 may want to understand and experience live sports events and scenery outside a moving vehicle, or learn and understand about the surrounding world. It is known that sighted people visualize the surrounding world by detection of edges between areas of different wavelengths of light, which is then perceived as different colors by brain. Based on feedback from the visual system, visual part of the brain referred to as visual cortex, processes visual information of the surrounding world to enable the sighted people to visualize the surrounding world. It is also known the loss of one or more senses, such as the sense of sight, generally results in enhancement of one or more of the remaining senses, such as sense of touch, hearing, smell, or taste, to compensate for the lost sense(s). The haptic feedback device 102 harnesses the non-visual senses, such as the sense of touch, hearing, or smell, to provide enhanced haptic sensation to users, such as the user 108, who have lost or impaired the sense of sight to provide enhanced user experience, for example, in live sports events, in moving vehicles, and other forms of entertainment by exploring the touch-sense of the users. In some embodiments, the haptic feedback device 102 may also be used by sighted people to gain unfamiliar and supplementary experiences by exploring their touch-sense in extended manner in additional to the visual sense.

The first video 114A and the second video 114B may correspond to real time or near-real time videos captured by the plurality of image-capture devices 104, which may be external devices or accessories paired with the haptic feedback device 102. In an embodiment, the first video 114A and the second video 114B may refer to live recordings of an ongoing sports event captured from different viewing angles. In another embodiment, the first video 114A and the second video 114B may refer to an outside scene of a vehicle (for example, a moving vehicle) as visible from different display windows of the vehicle, for example, from a left-side front display window, a right-side front display window, a left-side rear display window, a right-side rear display window, a front windshield, or a rear windshield, in the vehicle.

The mode selector 112 may include to a hardware mode selector, such as a button or a wheel, which may be used by a user (such as the user 108) to select at least one of the plurality of image-capture devices 104. In accordance with an embodiment, the mode selector 112 may further include a gesture recognition interface (for example, an image sensor, a touch sensor, or the like) that may be configured to recognize different gestures of the user 108 as different user inputs for selecting different image-capture devices of the plurality of image-capture devices 104. As each image-capture device of the plurality of image-capture devices 104 captures a real time or near-real time video (e.g., the first video 114A and the second video 114B) of the real time or near-real time event in the 3D real-world area 116 from different viewing angles, the mode selector 112 may be used to select at least one of the plurality of image-capture devices 104 that captures the video of the event from a specific viewing angle that the user 108 wants to experience. In an example, the real time or near-real time event may be an ongoing sports event and the user 108 is one of the spectators of the sports event. In such a scenario, the haptic feedback device 102 may enable a visually impaired user to non-visually discern and experience the ongoing sports event from different viewing angles by touch sense based on the generated plurality of different haptic cues on the haptic feedback interface 110 and audio. An example of the implementation of the haptic feedback device 102 for experiencing an ongoing sports event is described, for example, in FIG. 3. In another example, the real time or near-real time event may be an outside scene as visible from inside of a moving vehicle and the user 108 is one of the passengers in the moving vehicle. In such a scenario, the haptic feedback device 102 may enable a visually impaired user to non-visually discern and experience the outside scene as visible from different display windows of the moving vehicle by touch sense based on the generated plurality of different haptic cues on the haptic feedback interface 110 and audio. An example of the implementation of the haptic feedback device 102 for experiencing an outside scene of a moving vehicle event is described, for example, in FIG. 4.

In operation, the haptic feedback device 102 may be configured to receive a plurality of videos (for example, the first video 114A and the second video 114B) from the plurality of image-capture devices 104 (for example, the first image-capture device 104A and the second image-capture device 104B). The plurality of image-capture devices 104 has different field-of-views and captures the plurality of videos to record a real time or near-real time event in the 3D real-world area 116 from different viewing angles. The haptic feedback device 102 may be further configured to receive a first user input that indicates a selection of the first image-capture device 104A from the plurality of image-capture devices 104. The first user input may be received via the mode selector 112 in the form a gesture or a physical touch input on the mode selector 112. The haptic feedback device 102 may be configured to select the first image-capture device 104A streaming the first video 114A based on the first user input received via the mode selector 112. The user 108 may provide the first user input to select the first image-capture device 104A to experience the real time or near-real time event from a specific viewing angle corresponding to the first image-capture device 104A. The haptic feedback device 102 may be configured to receive a look-ahead buffer of an upcoming scene of the first video 114A in real time or near-real time from the first image-capture device 104A. In cases where the first video 114A is temporarily stored at the haptic feedback device 102, a video segment that corresponds to the upcoming scene of the first video 114A may be accessed from a memory of the haptic feedback device 102.

The haptic feedback device 102 may be configured to detect a plurality of different objects in the upcoming scene of the first video 114A based on the look-ahead buffer of the first video 114A. The haptic feedback device 102 may be configured to identify an object-type of each of the plurality of objects in the upcoming scene of the first video 114A. The haptic feedback device 102 may be configured to detect a plurality of different motion associated with the plurality of objects in the upcoming scene of the first video 114A based on the look-ahead buffer of the first video 114A.

In accordance with an embodiment, the haptic feedback device 102 may be configured to determine a haptic feedback for the upcoming scene of the first video 114A based on the look-ahead buffer of the first video 114A and the detected plurality of different motion associated with the plurality of objects. The haptic feedback device 102 may be configured to generate a plurality of different haptic cues on the haptic feedback interface 110 using the plurality of haptic elements. The plurality of different haptic cues on the haptic feedback interface 110 may be generated based on the determined haptic feedback. In some embodiments, the plurality of different haptic cues may include one or more movable haptic cues. The plurality of different haptic cues on the haptic feedback interface 110 may be generated in synchronization with a current scene of the first video 114A, based on the determined haptic feedback.

The haptic feedback device 102 may be configured to selectively reproduce the current scene of the first video 114A on the haptic feedback interface 110, based on the determined feedback. An example of the selective reproduction of the current scene is described, for example, in FIG. 3.

In an exemplary scenario, the user 108 may want to change the viewing angle. In such a scenario, the haptic feedback device 102 may be further configured to receive, after the first user input, a second user input that indicates a selection of the second image-capture device 104B from the plurality of image-capture devices 104. The second user input may be received via the mode selector 112 in the form a gesture or a physical touch input on the mode selector 112. The haptic feedback device 102 may be configured to select the second image-capture device 104B streaming the second video 114B based on the second user input received via the mode selector 112. The user 108 may provide the second user input to select the second image-capture device 104B to experience the real time or near-real time event from a new viewing angle. The haptic feedback device 102 may be configured to receive a look-ahead buffer of an upcoming scene of the second video 114B in real time or near-real time from the second image-capture device 104B. The haptic feedback device 102 may be configured to detect a plurality of different objects in the upcoming scene of the second video 114B based on the look-ahead buffer of the second video 114B. The haptic feedback device 102 may be configured to identify an object-type of each of the plurality of objects in the upcoming scene of the second video 114B. The haptic feedback device 102 may be configured to detect a plurality of different motion associated with the plurality of objects in the upcoming scene of the second video 114B based on the look-ahead buffer of the second video 114B. The haptic feedback device 102 may be configured to determine a haptic feedback for the upcoming scene of the second video 114B based on the look-ahead buffer of the second video 114B and the detected plurality of different motion associated with the plurality of objects in the upcoming scene of the second video 114B. The haptic feedback device 102 may be configured to generate a plurality of different haptic cues on the haptic feedback interface 110 using the plurality of haptic elements. The plurality of different haptic cues on the haptic feedback interface 110 may be generated based on the determined haptic feedback. The plurality of different haptic cues on the haptic feedback interface 110 may be generated in synchronization with a current scene of the second video 114B, based on the determined haptic feedback.

In other words, based on the second user input, the haptic feedback device 102 may be further configured to switch from the current scene of the first video 114A to selectively reproduce on the haptic feedback interface 110 the current scene of the second video 114B that is captured by the second image-capture device 104B.

The somatic sensory system of human body is responsible for the sense of touch and has sensory touch or pressure receptors that enable a human to detect and feel when something comes into contact with skin. The sense of touch may also be referred to as somatic senses or somesthetic senses that include proprioception (e.g. sense of position and movement) or haptic perception. Typically, such sensory receptors for sense of touch are present, for example, on the skin, epithelial tissues, muscles, bones and joints, and even on certain internal organs of the human body. Thus, various haptic sensations may be provided to the human body by the haptic feedback device 102, as further described in details, for example, in FIGS. 2A, 2B, 3, 4, 5A, 5B, and 5C.

Figure 2A:
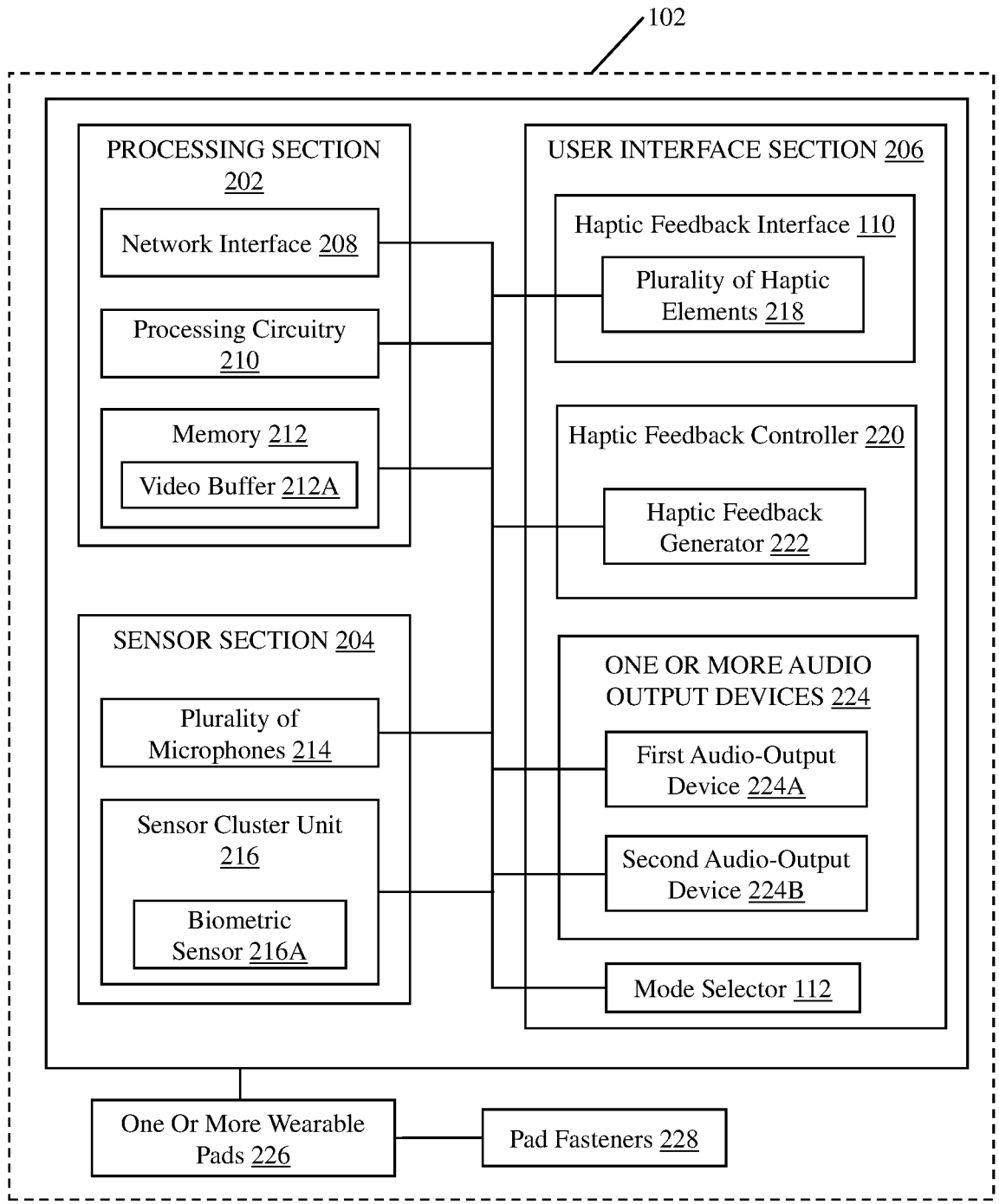
FIG. 2A is a block diagram that illustrates an exemplary haptic feedback device for providing haptic sensation, in accordance with an embodiment of the disclosure.

FIG. 2A is a block diagram that illustrates an exemplary haptic feedback device for providing haptic sensation, in accordance with an embodiment of the disclosure. FIG. 2A is explained in conjunction with elements from FIG. 1. With reference to FIG. 2A, there is shown the haptic feedback device 102. The haptic feedback device 102 may include a processing section 202, a sensor section 204, and a user interface section 206. The processing section 202 may include a network interface 208, a processing circuitry 210, and a memory 212. The memory 212 may include a portion, referred to as a video buffer 212A, for temporary storage and processing of look-ahead buffer of a real time or near-real time video (e.g., the first video 114A or the second video 114B). The sensor section 204 may include a plurality of microphones 214 and a sensor cluster unit 216. The sensor cluster unit 216 may include at least a biometric sensor 216A. The user interface section 206 may include the haptic feedback interface 110, a haptic feedback controller 220, and one or more audio-output devices, such as a first audio-output device 224A and a second audio-output device 224B, and the mode selector 112. The haptic feedback interface 110 may include a plurality of haptic elements 218. The haptic feedback controller 220 may include a haptic feedback generator 222.

In accordance with an embodiment, the haptic feedback device 102 may be communicatively coupled to one or more external devices, such as the plurality of image-capture devices 104, through the communication network 106, by use of the network interface 208. The processing circuitry 210 may be communicatively coupled to the memory 212, and the various components of the sensor section 204 and the user interface section 206, via a system bus.

The network interface 208 may comprise suitable logic, circuitry, interfaces, and/or code that may be configured to receive look-ahead buffer of the real time or near-real time video captured by at least one of the plurality of image-capture devices 104. The network interface 208 may be further configured to communicate with external devices, such as the plurality of image-capture devices 104, via the communication network 106. The network interface 208 may implement known technologies to support wireless communication. The network interface 208 may include, but are not limited to, a transceiver (e.g. a radio frequency (RF) transceiver), an antenna, one or more amplifiers, a tuner, one or more oscillators, a digital signal processor, a coder-decoder (CODEC) chipset, a subscriber identity module (SIM) card, and/or a local buffer.

The network interface 208 may communicate via wireless communication with networks, such as the Internet, an Intranet and/or a wireless network, such as a cellular telephone network, a wireless local area network (WLAN), a personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), BLUETOOTH™, Wireless Fidelity (such as IEEE 802.11a, IEEE 802.11b, IEEE 802.11g, IEEE 802.11n, and/or any other IEEE 802.11x protocol), voice over Internet Protocol (VoIP), Wi-MAX, Internet-of-Things (IoT) technology, Li-Fi, Machine-Type-Communication (MTC) technology, a protocol for email, instant messaging, and/or Short Message Service (SMS).

The processing circuitry 210 may refer a digital signal processor (DSP). The processing circuitry 210 may comprise suitable logic, circuitry, interfaces, and/or code that may be configured to detect a plurality of different motion associated with a plurality of objects in an upcoming scene of the real time or near-real time video based on the look-ahead buffer of the real time or near-real time video captured by at least one of the plurality of image-capture devices 104. The haptic feedback device 102 may be a programmable device, where the processing circuitry 210 may execute instructions stored in the memory 212. Other implementation examples of the processing circuitry 210 may include, but are not limited to a specialized DSP, a Reduced Instruction Set Computing (RISC) processor, an Application-Specific Integrated Circuit (ASIC) processor, a Complex Instruction Set Computing (CISC) processor, and/or other processors.

The memory 212 may comprise the video buffer 212A and a learning engine. The processing circuitry 210 may be configured to determine one or more patterns in a plurality of user interactions on the haptic feedback interface 110 over a period of time based on a track of a usage pattern of the haptic feedback device 102 by the learning engine. The memory 212 may include suitable logic, circuitry, and/or interfaces that may be configured to store a set of instructions executable by the processing circuitry 210. The memory 212 may be further configured to temporarily store one or more video segments in the video buffer 212A for real time or near-real time processing of the video data of the real time or near-real time video. The memory 212 may also store usage history, an amount of pressure exerted by the user 108 while touching the haptic feedback interface 110 in the plurality of user interactions on the haptic feedback interface 110 over a period of time. The memory 212 may also store input and output preference settings by the user 108. The memory 212 may be further configured to store therein a plurality of gestures corresponding to different user inputs. For example, a first gesture of turning the head towards right direction may indicate the first user input to select the first image-capture device 104A and a second gesture of turning the head towards left direction may indicate the second user input to select the second image-capture device 104B. The plurality of gestures may be customizable by the user 108 or may predefined gestures. Examples of implementation of the memory 212 may include, but not limited to, a random access memory (RAM), a dynamic random access memory (DRAM), a static random access memory (SRAM), a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory.

The plurality of microphones 214 may comprise suitable circuitry and/or interfaces to receive an audio input. In accordance with an embodiment, the audio input may be provided by the user 108. The audio input may correspond to a voice input to the haptic feedback device 102. In accordance with an embodiment, the plurality of microphones 214 may be muted or disabled in accordance with user preferences. The plurality of microphones 214 may capture sound emanating in proximity of the user 108 of the haptic feedback device 102. In accordance with an embodiment, user inputs may be provided as voice commands captured via the plurality of microphones 214.

The sensor cluster unit 216 may include a biometric sensor 216A, such as a fingerprint sensor, to decipher the identity of a user, such as the user 108. In certain scenarios, the haptic feedback device 102 may be used by multiple users, for example, users of a same family, or group. In such a case, based on user authentication by use of the biometric sensor, a different usage profile and user settings may be loaded for different users. In some embodiments, the sensor cluster unit 216 may also include a temperature sensor and a pressure sensor to gauge pressure applied by a user, such as the user 108, on the haptic feedback interface 110. In some embodiments, the sensor cluster unit 216 may include the location sensor, an image sensor, a radio frequency (RF) sensor, an accelerometer, a gyroscope, a compass, a magnetometer, a depth sensor, an altimeter, a lux meter, an ultrasound sensor, an IR sensor, or one or more weather sensors. The image sensor may be configured to capture one or more gestures of the user 108.

The haptic feedback interface 110 may comprise the plurality of haptic elements 218. The plurality of haptic elements 218 may refer to an array of cylindrical tubes arranged at the surface of the haptic feedback interface 110. A person of ordinary skill in the art may understand that shape of each tube may be variable, such as conical, hexagonal, or other polygonal shapes, without departing from the scope of the disclosure. In accordance with an embodiment, the plurality of haptic elements 218 may be arranged as a layer (of array of cylindrical tubes) on the haptic feedback generator 222 such that a haptic signal may be generated by the haptic feedback generator 222 through each of the plurality of haptic elements 218. In accordance with an embodiment, one end (e.g. a proximal end) of each tube of the array of cylindrical tubes may be coupled to the haptic feedback generator 222, and the other end (e.g. a distal end) may be interspersed on the haptic feedback interface 110 such that a plurality of differential touch-discernible cues generated by the haptic feedback generator 222 in conjunction with the plurality of haptic elements 218 are discernible on the haptic feedback interface 110 by the sense of touch.

The haptic feedback controller 220 may comprise suitable circuitry and interfaces to determine a haptic feedback for the upcoming scene of the real time or near-real time video based on the look-ahead buffer of the real time or near-real time video and the detected plurality of different motion associated with the plurality of objects. In some embodiments, the haptic feedback controller 220 may be configured to sense a haptic user input via the plurality of haptic elements 218 based on a defined amount of pressure detected at one or more haptic elements of the plurality of haptic elements 218. For example, the haptic user input may be sensed to receive user input via the haptic feedback interface 110. The haptic feedback controller 220 includes the haptic feedback generator 222. The haptic feedback generator 222 may be configured to generate one or more movable haptic cues on the haptic feedback interface 110 using the plurality of haptic elements 218 in synchronization with a current scene of the real time or near-real time video, based on the determined haptic feedback. The haptic feedback generator 222 further generates a plurality of different haptic cues that includes the one or more movable haptic cues under the control of the haptic feedback controller 220. The haptic feedback generator 222 may include one or more differential pressure generating units, differential electric pulse generating units, shape-pattern extension and retraction units, differential temperature generating units, and a level of protrusion setter to control elevation of raised shape patterns, such as spikes through the plurality of haptic elements 218. The haptic feedback generator 222 may be configured to generate the plurality of different haptic cues by use of one or more of the differential pressure generating units, differential electric pulse generating units, shape-pattern extension and retraction units, differential temperature generating units, and the level of protrusion setter to control elevation of raised shape pattern.

The one or more audio-output devices 224, such as the first audio-output device 224A and the second audio-output device 224B, may comprise suitable circuitry and/or interfaces to generate an audio output for the user 108. In accordance with an embodiment, the audio output may be generated in-sync with the touch-discernible haptic output, such as the plurality of different haptic cues, on the haptic feedback interface 110. In accordance with an embodiment, the audio output may be generated in-sync with a haptic input received on the haptic feedback interface 110. The haptic input may be detected by the haptic feedback controller 220 by use of the pressure sensor of the sensor cluster unit 216. In accordance with an embodiment, the one or more audio-output devices 224 may be muted or disabled based on a time-of-day or for a specific location, such as a public library where silence is solicited. Though FIG. 2A is shown to include two audio-input devices, a person of ordinary skill in the art may understand that the haptic feedback device 102 may include a single audio-input device, or more than two audio-input devices.

Each of the one or more wearable pads 226 may refer to a suitable pad that acts as a substrate for the haptic feedback device 102. Each of the one or more wearable pads 226 may be water-resistant pads suitable to be worn on different parts of the human body, such as forearms, limbs, waist, or as a complete clothing item. In accordance with an embodiment, each of the one or more wearable pads 226 may be designed such that the haptic feedback interface 110 may be in contact to the skin of the human body. The pad fasteners 228 refer to detachable fasteners that allow the two terminal portions of each of the one or more wearable pads 226 to detachably affix with each other. Examples of the pad fasteners 228 may include, but are not limited to clips, hook and loop fastener, detachable straps, buttons, and the like.

The various operations of the haptic feedback device 102 described in FIG. 1 may be performed by the different components of the haptic feedback device 102, as described in FIG. 2A. The various operations or functions of the different components of the haptic feedback device 102 may be further understood, for example, from FIGS. 2B, 3, 4, 5A, 5B, and 5C.

Figure 2B:
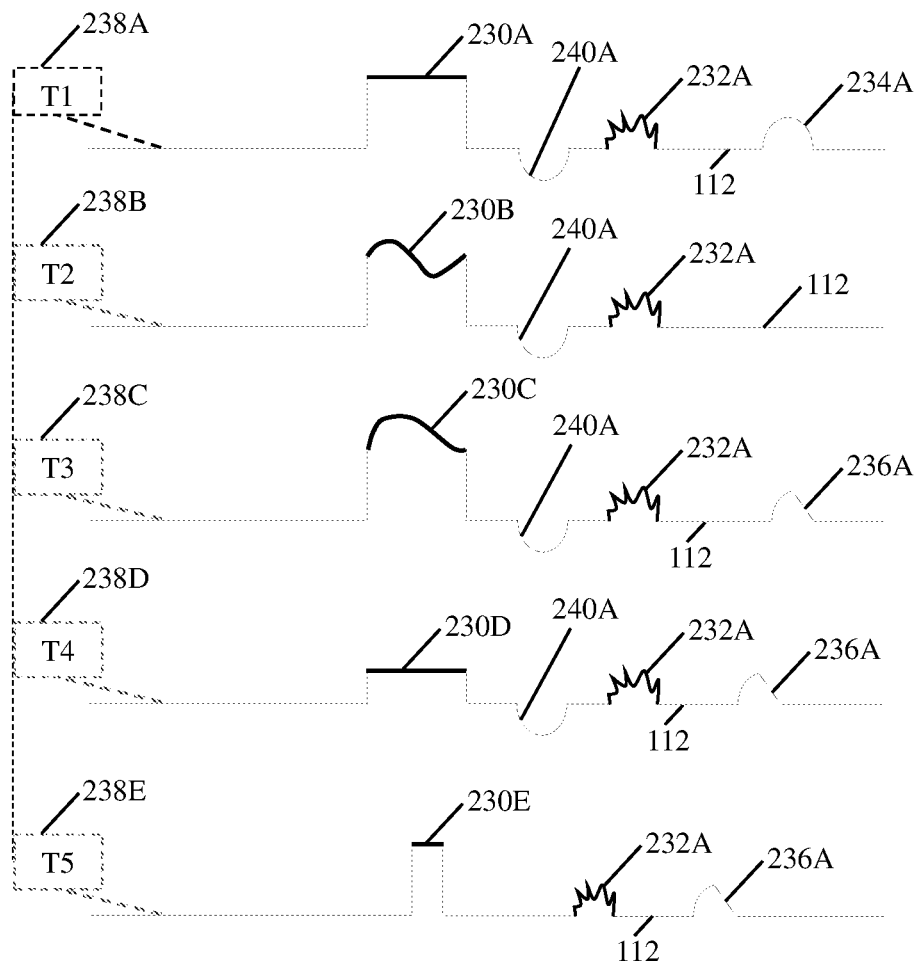
FIG. 2B illustrates exemplary protrusions and depressions on a haptic feedback interface of the haptic feedback device of FIG. 2A for providing haptic sensation, in accordance with an embodiment of the disclosure.

FIG. 2B illustrates exemplary protrusions and depressions on a haptic feedback interface of the haptic feedback device of FIG. 2A for providing haptic sensation, in accordance with an embodiment of the disclosure. FIG. 2B is described in conjunction with elements from FIGS. 1 and 2A. With reference to FIG. 2B, there is shown a surface portion of the haptic feedback interface 110 with protrusions 230A to 230E, 232A, 234A, and 236A at different time instants 238A to 238E. There is also shown a depression 240A on the haptic feedback interface 110 at the different time instants 238A to 238D.

At time instant 238A, the protrusion 230A may be generated on the surface portion of the haptic feedback interface 110 by the haptic feedback generator 222. The protrusion 230A may be a haptic cue generated on the haptic feedback interface 110. At time instant 238B, the protrusion 230A (the same protrusion) may deform into a different shape, as shown by the protrusion 230B. At a next time instant, such as the time instant 238C, the protrusion 230B may deform further to another shape, such as the protrusion 230C, or return to its original shape, such as the protrusion 230A. The same protrusion, such as the protrusion 230A, may have different meanings based on the deformation (as indicated by protrusions 230B, 230C, 230D, and 230E). The deformation may indicate an intra-movement related to an object in the real time or near-real time video. For example, a person standing in the real time or near-real time video may suddenly be raise their hands. This change or intra-movement may be represented by the protrusion 230A that deforms to protrusion 230D. In this case, the deformation may correspond to partial retraction of one or more haptic elements of the plurality of haptic elements 218 to change the level of elevation of the protrusion 230A from a first level to a second level. The second level of elevation may be different than the first level of elevation. The protrusion 230E, for example, shows a deformation of the protrusion 230A where the size of the protrusion 230A is reduced. Thus, the same protrusion may have different meanings based on the deformation. In another example, the protrusion 230A may be a constantly deforming protrusion (e.g. deformed from protrusion 230A to the protrusions 230B and 230C) at different time instants 238A, 238B, and 238C. Based on a touch on the constantly deforming protrusion (such as the protrusion 230A), the user 108 may discern certain changes related to an object in the real time or near-real time video. For example, movement of a player in soccer match may be represented by the protrusions 230A, 230B, and 230C, which may be sensed by touch on the constantly deforming protrusion.

In accordance with an embodiment, the plurality of different haptic cues may be generated as a plurality of protrusions of different shapes that are extended from the surface of the haptic feedback interface 110. For example, the protrusions 230A, 232A, 234A, and 236A. The 232A may be a static protrusion, which may not change its shape or location at different time instants 238A to 238E, as shown. The protrusion 234A may be round shaped protrusion generated at the time instant 238A but may be retracted at next time instants 238B to 238E. The protrusion 236A may be a new movable protrusion generated at the time instant 238C. The protrusion 236A may move or appear to move from its original position to a new position at different time instants, such as the time instant 238D and 238E. This movement of protrusions may be used to indicate inter-movement of different detected objects in the real time or near-real time video. For example, movement of different vehicles outside a moving vehicle and as visible from inside of the moving vehicle or movement of different players in a soccer match.

Figure 3:
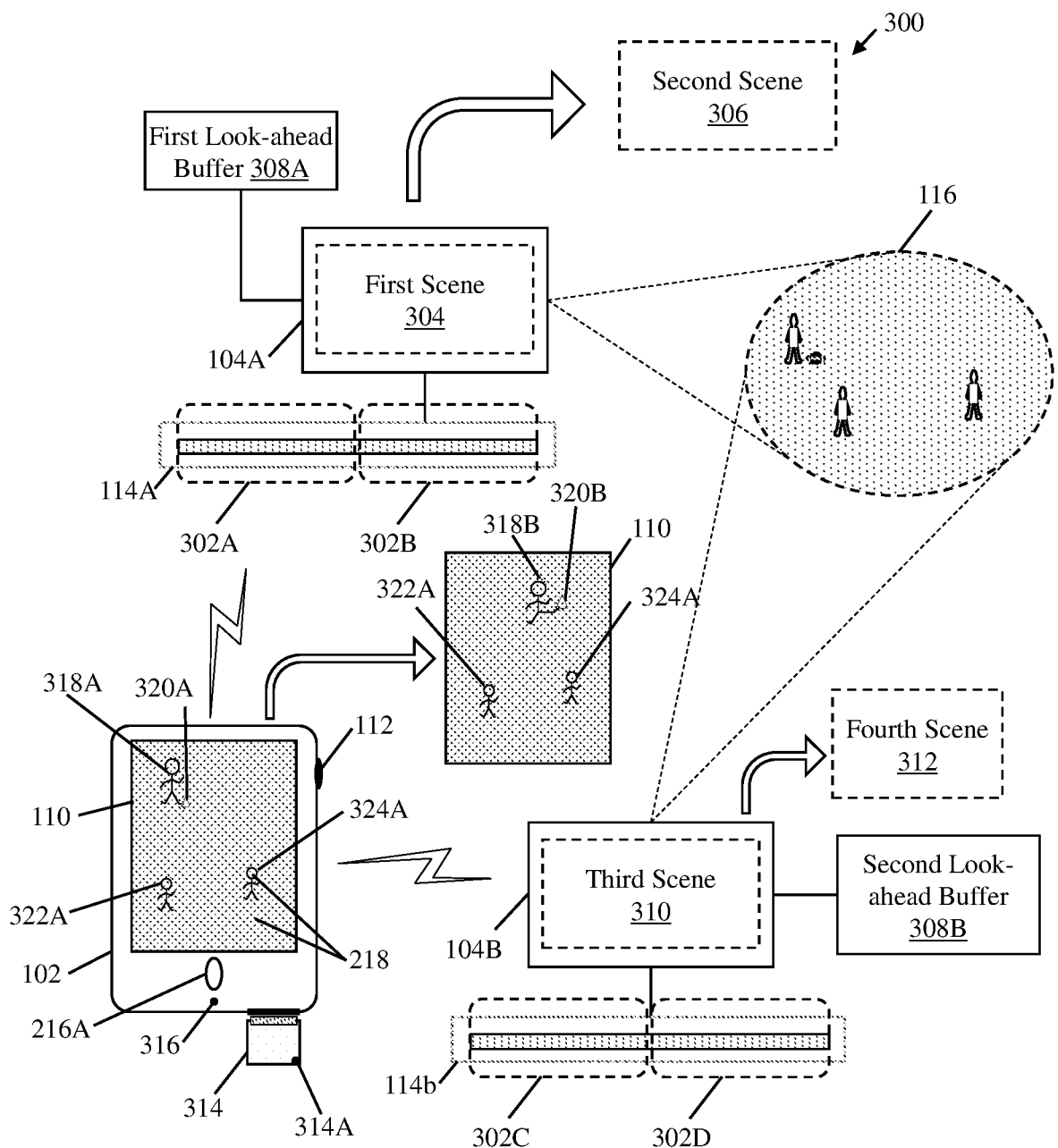
FIG. 3 illustrates a first exemplary scenario for implementation of the exemplary haptic feedback device of FIG. 2A for providing haptic sensation, in accordance with an embodiment of the disclosure.
Figure 4:
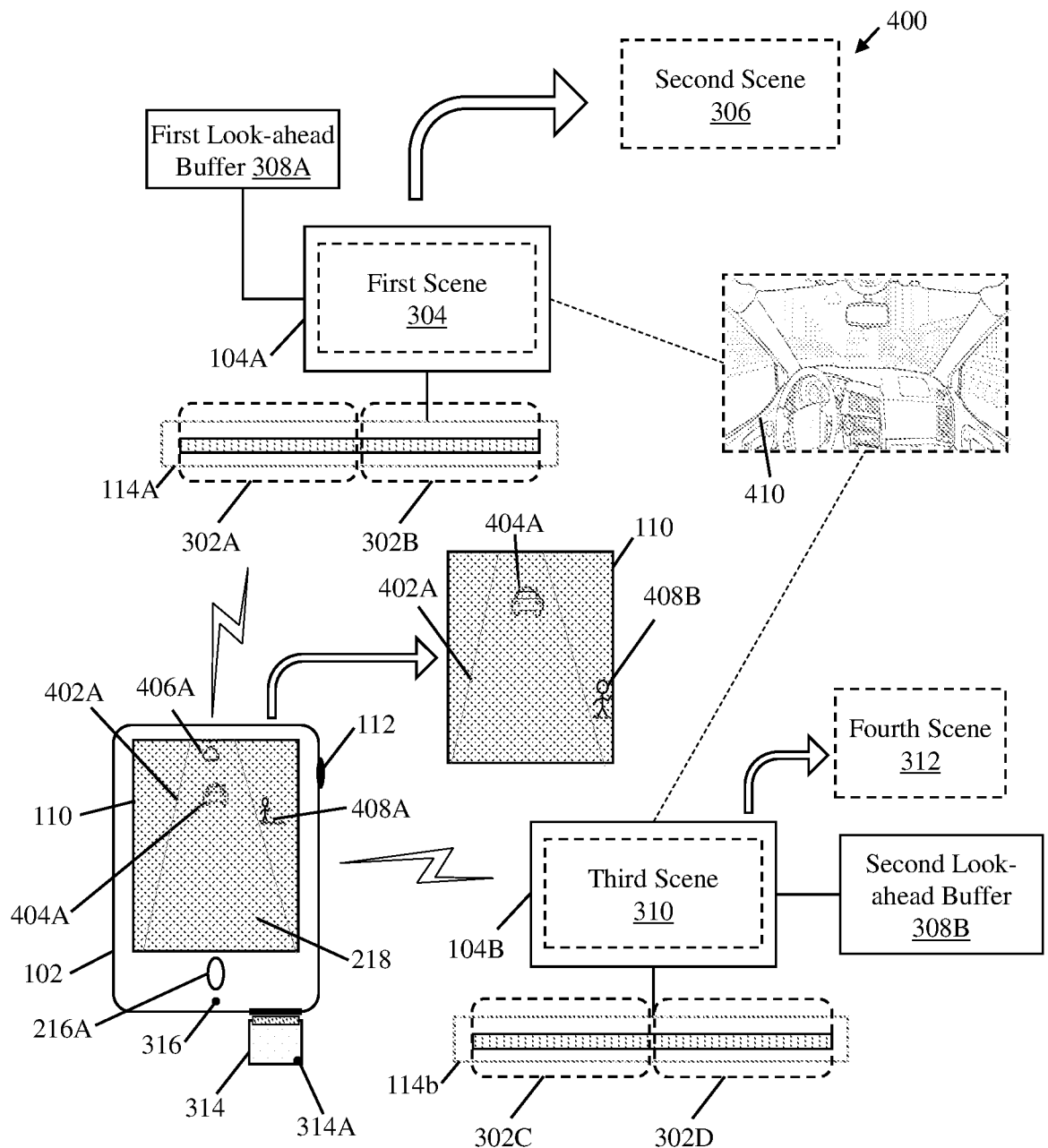
FIG. 4 illustrates a second exemplary scenario for implementation of the exemplary haptic feedback device of FIG. 2A for providing haptic sensation, in accordance with an embodiment of the disclosure.

The generation of the plurality of protrusions of different shapes are also shown, for example, as haptic cues 318A, 320A, 322A, 324A, and 318B in the FIG. 3 and as haptic cues 402A, 404A, 406A, 408A, and 408B in FIG. 4. In accordance with an embodiment, the plurality of different haptic cues may also be generated as a plurality of depressions of different shapes that are represented as concavities at the surface of the haptic feedback interface 110. For example, the depression 240A may be round shaped depression that is indicative of a pothole, a hole, or other concavities.

Different shapes generated by the haptic feedback generator 222, may not be limited to the oval, round, square, triangle, and other shapes, for example, any polygonal shapes or human-like shapes may be generated based on user-preference. In accordance with an embodiment, the shape of a protrusion may be customized by users of the haptic feedback device 102 in accordance with their needs or preferences. For example, a voice command may be provided by the user 108, for example, "generate a star-shaped pattern to represent a building". At least one of plurality of microphones 214 may capture the voice command. The processing circuitry 210 may be configured to interpret the voice command and instruct the haptic feedback controller 220 to generate a star-shaped protrusion based on the interpreted voice command. The haptic feedback controller 220 may be configured to generate the protrusion 232A, which may be in a customized shape, such as the star-shaped pattern. In some embodiments, the customization of shape patterns may be done via the haptic feedback interface 110 using one or more control buttons (not shown).

FIG. 3 illustrates a first exemplary scenario for implementation of the exemplary haptic feedback device of FIG. 2A for providing haptic sensation, in accordance with an embodiment of the disclosure. FIG. 3 is described in conjunction with elements from FIGS. 1, 2A, and 2B. With reference to FIG. 3, there is shown a first exemplary scenario 300 that includes the first image-capture device 104A, the second image-capture device 104B, and the haptic feedback device 102. The first video 114A may be captured by the first image-capture device 104A to record an ongoing sports event in the 3D real-world area 116 from a first viewing angle and the second video 114B may be captured by the second image-capture device 104B to record the ongoing sports event in the 3D real-world area 116 from a second viewing angle different from the first viewing angle. There is shown a plurality of consecutive video segments (such as a first segment 302A and a second segment 302B) of the first video 114A. The first segment 302A includes a first sequence of image frames that corresponds to a first scene 304 of the first video 114A. The second segment 302B includes a second sequence of image frames that corresponds to a second scene 306 of the first video 114A. At the time of processing of the first segment 302A of the first video 114A corresponding to a current scene, such as the first scene 304, to be rendered on the haptic feedback device 102, video data (such as the second segment 302B) related to an upcoming scene (such as the second scene 306) captured by the first image-capture device 104A, may be stored in advance as a first look-ahead buffer 308A in the memory of the first image-capture device 104A. There is further shown a plurality of consecutive video segments (such as a third segment 302C and a fourth second segment 302D) of the second video 114B. The third segment 302C includes a third sequence of image frames that corresponds to a third scene 310 of the second video 114B. The fourth segment 302D includes a fourth sequence of image frames that corresponds to a fourth scene 312 of the second video 114B. At the time of processing of the third segment 302C of the second video 114B corresponding to a current scene, such as the third scene 310, to be rendered on the haptic feedback device 102, video data (such as the fourth segment 304) related to an upcoming scene (such as the fourth scene 312) captured by the second image-capture device 104B, may be stored in advance as a second look-ahead buffer 308B in the memory of the second image-capture device 104B. The first scene 304 of the first video 114A and the third scene 310 of the second video 114B may be captured at the same time instance by the first image-capture device 104A and the second image-capture device 104B from two different viewing angles, for example, the first viewing angle and the second viewing angle, respectively. Similarly, the second scene 306 of the first video 114A and the fourth scene 312 of the second video 114B may be captured at the same time instance by the first image-capture device 104A and the second image-capture device 104B from the first viewing angle and the second viewing angle, respectively.

In accordance with the first exemplary scenario 300, there is further shown the mode selector 112 (for example, a mode selector wheel), a learning unit 314, a microphone 316, and a plurality of different haptic cues, such as a first haptic cue 318A, a second haptic cue 320A, a third haptic cue 322A, and a fourth haptic cue 324A. There is also shown the haptic feedback interface 110 and the plurality of haptic elements 218 of the haptic feedback interface 110. The haptic feedback device 102 may be communicatively coupled to the first image-capture device 104A and the second image-capture device 104B via a wireless connection, such as the communication network 106, and may receive the first video 114A and the second video 114B from the first image-capture device 104A and the second image-capture device 104B, respectively.

In accordance with the first exemplary scenario 300, the user 108 may be a visually impaired person who may want to experience and non-visually discern the ongoing sports event captured live by the first image-capture device 104A and the second image-capture device 104B. The user 108 may then select one of the first image-capture device 104A and the second image-capture device 104B using the mode selector 112 to experience the ongoing sports event from a specific viewing angle, for example, the first viewing angle or the second viewing angle. In a non-limiting example, it is assumed that using the mode selector 112, the user 108 may select the first image-capture device 104A to experience the ongoing sports event from the first viewing angle.

The learning unit 314 may be a learning assistant for the user 108 that may assist the user 108 to learn not only the operation of the haptic feedback device 102 but also help understand meaning of each haptic cue of the plurality of different haptic cues generated on the haptic feedback interface 110. The learning unit 314 may be a detachable hardware component of the haptic feedback device 102. For example, the user 108 may provide a haptic input on a haptic cue, for example, the first haptic cue 318A, the second haptic cue 320A, the third haptic cue 322A, or the fourth haptic cue 324A generated on the haptic feedback interface 110 based on the first video 114A. The user 108 may press a protrusion (or a bulge) generated as the haptic cue on the haptic feedback interface 110. Based on the amount of pressure exerted by the user 108 while touching the protrusion on the haptic feedback interface 110, the press may be considered a haptic input by the haptic feedback controller 220. In cases where the amount of pressure exerted by the user 108 on a particular point or a protrusion on the haptic feedback interface 110 is greater than a threshold pressure value, the press of the protrusion (or a bulge) may be considered a haptic input for that particular object detected in the first video 114A. A corresponding action related to the pressed protrusion may be executed by the haptic feedback controller 220 in association with the processing circuitry 210. For example, when the first haptic cue 318A is pressed, an audio output in combination with a Braille feedback may be generated on the learning unit 314 to learn about the object represented by the first haptic cue 318A. For example, raised dots for "player A" may appear in Braille on the learning unit 314. There may be another button 314A on the learning unit 314. A press of the other button 314A may present additional information about the player A in the first video 114A. For example, "this player A has scored one goal" may be output as Braille feedback, as audio, or combination of both audio and the Braille feedback. This enables learning about the object-type, augmented information about the object, an action in the first video 114A, the shape associated with the haptic cues, and other meanings in the learning period. Thus, the learning unit 314 acts as the learning assistant or a self-help haptic guide. After certain period of time, when the user 108 may be acquainted with the usage of the haptic feedback device 102 or the generated cues, the learning unit 314 may be detached or plugged out from the haptic feedback device 102.

In accordance with an embodiment, the network interface 208 may be configured to access the first look-ahead buffer 308A of the upcoming scene (such as the second scene 306) of the first video 114A when a current scene (such as the first scene 304) of the first video 114A is being rendered on the haptic feedback interface 110. The second segment 302B of the first video 114A that corresponds to the upcoming scene (such as the second scene 306) may be received (or retrieved) in real time or near-real time from the first image-capture device 104A, via the communication network 106.

The processing circuitry 210 of the haptic feedback device 102 may be configured to detect a plurality of different objects in the upcoming scene of the first video 114A based on the first look-ahead buffer 308A of the upcoming scene (such as the second scene 306) of the first video 114A. For example, in this case, the detected plurality of objects in the upcoming scene may be three players and a soccer ball. The processing circuitry 210 may be further configured to identity an object-type of each of the plurality of objects in the upcoming scene of the first video 114A based the first look-ahead buffer 308A of the first video 114A. For example, in this case, the object-type in the upcoming scene (such as the second scene 306) may be identified as three boys and a soccer ball.

The processing circuitry 210 may be further configured to detect the plurality of different motion associated with the plurality of objects in the upcoming scene of the first video 114A based on the first look-ahead buffer 308A of the first video 114A. Both intra-motion and inter-motion associated with the plurality of objects may be detected. The intra-motion of an object refers to movement within the object, such as movement of different parts of an object while the object is standing or located at a particular place. For example, movement of limbs, waist, face, and the like, while a human being is standing at a place. The inter-motion refers to movement of objects with respect to each other. For example, a human object moving from one location to other as detected in the first video 114A.

In accordance with an embodiment, the processing circuitry 210 may be configured to determine a relative position and height of each of plurality of objects with respect to each other. For example, it may be detected that one of the three players is in possession of the soccer ball while the other two players are trying to chase the player who is in possession of the soccer ball. Thus, different motion, relative position, and height of each object may be determined for later use during determination of a haptic feedback to be generated on the haptic feedback interface 110. Further, the processing circuitry 210 may be configured to determine the speed and the direction of travel of each of the moving objects (such as the three players and the soccer ball in this case) of the plurality of objects.

The haptic feedback controller 220 may be configured to determine a haptic feedback for the upcoming scene (such as the second scene 306) of the first video 114A based on the first look-ahead buffer 308A of the first video 114A and the detected plurality of different motion associated with the plurality of objects. The haptic feedback controller 220 may be configured to determine a scaling factor based on an aspect ratio of the first video 114A and a defined haptic output area of the haptic feedback interface 110. The defined haptic output area may refer to a spatial area of the haptic feedback interface 110 on which the determined haptic feedback is to be generated. The scaling factor may be utilized to map the detected plurality of objects to the plurality of haptic elements 218 of the haptic feedback interface 110.

The haptic feedback generator 222 may be configured to generate the plurality of different haptic cues (such as the first haptic cue 318A, the second haptic cue 320A, the third haptic cue 322A, and the fourth haptic cue 324A) on the haptic feedback interface 110 using the plurality of haptic elements 218, based on the determined haptic feedback for the first video 114A. In some embodiments, the plurality of different haptic cues may include one or more movable haptic cues, such as the first haptic cue 318A, the second haptic cue 320A, the third haptic cue 322A, and the fourth haptic cue 324A in this case. The first haptic cue 318A may correspond to the player in possession of the soccer ball and the second haptic cue 320A may correspond to the soccer ball. The third haptic cue 322A and the fourth haptic cue 324A may correspond to the other two players who are chasing the player in possession of the soccer ball.

The haptic feedback generator 222 may be configured to generate the one or more movable haptic cues on the haptic feedback interface 110 using the plurality of haptic elements 218 in synchronization with the current scene of the first video 114A, based on the determined haptic feedback. The one or more movable haptic cues may be generated on the haptic feedback interface 110 at a time instant when the second scene 306 is rendered as the current scene on the haptic feedback interface 110. Thus, the generated plurality of different haptic cues (such as the first haptic cue 318A, the second haptic cue 320A, the third haptic cue 322A, and the fourth haptic cue 324A) on the haptic feedback interface 110 may be constantly synchronized with the current scene rendered on the haptic feedback interface 110. The plurality of different haptic cues (such as the first haptic cue 318A, the second haptic cue 320A, the third haptic cue 322A, and the fourth haptic cue 324A) may be generated by a touch-discernible modality. The touch-discernible modality may include at least one of a differential pressure-based modality, a differential temperature-based modality, a differential electric pulse-based modality, a differential raised shape pattern-based modality, or a combination of different touch-discernible modalities.

The differential pressure-based modality refers to generation of the plurality of different haptic cues as multi-level pressure or different amount of pressure on the haptic feedback interface 110. A user, such as the user 108, may feel different amount of pressure at different points (or portions) on the haptic feedback interface 110, which enables the user 108 to discern certain characteristics, for example, positioning or object-type of the plurality of objects, of the first video 114A by touch on the haptic feedback interface 110. Similarly, the differential temperature-based modality refers to generation of the plurality of different haptic cues as different temperatures, for example, different combination of hot and cold temperatures, on the haptic feedback interface 110. The different level of temperature may enable the user 108 to discern, certain characteristics, for example, positioning or object-type of the plurality of objects, of the first video 114A by touch on the haptic feedback interface 110. The differential electric pulse-based modality refers to generation of the plurality of different haptic cues as different level of electric-pulses on the haptic feedback interface 110. The different level of electric-pulses may enable the user 108 to feel, certain characteristics, for example, positioning or object-type of the plurality of objects, of the first video 114A by touch on the haptic feedback interface 110. The different level of electric-pulses may be felt as different amount of pain or pricking points. The differential raised shape pattern-based modality refers to generation of the plurality of different haptic cues as a plurality of protrusions of different shapes that may be extended from the surface of the haptic feedback interface 110, as shown. Each protrusion may be a raised shape-pattern or a bulge that may stick out from at least one or a group of haptic elements of the plurality of haptic elements 218 of the haptic feedback interface 110. The plurality of protrusions, such as the first haptic cue 318A, the second haptic cue 320A, the third haptic cue 322A, and the fourth haptic cue 324A) may represent the plurality of objects of the first video 114A (as observed in the current scene of the first video 114A).

In accordance with an embodiment, the haptic feedback generator 222 may be configured to control a relative positioning of the plurality of different haptic cues on the haptic feedback interface 110 to selectively reproduce the current scene (such as the second scene 306) of the first video 114A. The selective reproduction of the current scene (i.e., the second scene 306) may correspond to removal of one or more irrelevant objects detected in the first video 114A. The relevancy and irrelevancy of each object of the detected plurality of objects may be estimated based on a predicted interest quotient for each of the plurality of objects or a screen size occupied by an object in the current scene of the first video 114A. For example, a plurality of chairs on which audiences of the soccer event may be seated may be assigned the least interest quotient among other objects of the plurality of objects. The objects, for which the predicted interest quotient is below a defined threshold value, may be considered as irrelevant. Removal of irrelevant objects detected in the first look-ahead buffer 308A of the first video 114A for selective reproduction of the current scene (i.e., the second scene 306), may significantly save the processing time and battery power consumption for the generation of the plurality of different haptic cues on the haptic feedback interface 110.

In accordance with an embodiment, the haptic feedback generator 222 may be configured to control deformation of a haptic cue, such as the first haptic cue 318A, on the haptic feedback interface 110 such that an intra-movement of an object (e.g. the movement of limbs of the player) may be discernible by tactioception. For example, the first haptic cue 318A may be a movable haptic cue generated as a protrusion of a human-like shape-pattern extending from the haptic feedback interface 110. The one or more motion from the detected plurality of different motion associated with the player in possession of the soccer ball in the upcoming scene of the first video 114A may be discernible based on a movement of the deformation of the first haptic cue 318A on the haptic feedback interface 110. A fifth haptic cue 318B is an example of the deformation of the first haptic cue 318A to non-visually discern the intra-movement of the player in possession of the soccer ball. In this case, the intra-movement refers movement of hands and legs of the player to hold the soccer ball while standing at the same place.

In accordance with an embodiment, the haptic feedback generator 222 may be configured to control movement of the one or more movable haptic cues on the haptic feedback interface 110 such that an inter-movement among a set of moving objects of the plurality of objects, which may be discernible by tactioception. In some embodiments, a rate-of-change of movement of the one or more movable haptic cues may be further controlled in accordance with the determined scaling factor. For example, when the three players move to different positions on ground, the first haptic cue 318A, the third haptic cue 322A, and the fourth haptic cue 324A may move in-synchronization to the moment of the three players in the first video 114A.

Similar to the sighted people (i.e., people who have not lost sense of sight) who use information about the features on the surface of an object, like color, shading, or overall size, and shape, to recognize an object, the people who have lost the sense of sight may also identify an object-type, object position, and motion associated with an object in the first video 114A based on a touch on the protrusions of different shapes, such as the first haptic cue 318A, the second haptic cue 320A, the third haptic cue 322A, and the fourth haptic cue 324A, where an association of a particular shape and motion with a particular object-type may be learned by the brain. For example, in this case, a triangle shaped haptic cue (i.e., the second haptic cue 320A) is indicative of the soccer ball and a human-shaped haptic cue (i.e., the first haptic cue 318A, the third haptic cue 322A, the fourth haptic cue 324A, and the fifth haptic cue 318B) may be indicative of a human (such as the dancing girl). Notwithstanding, different shapes generated by the haptic feedback generator 222, may not be limited to the shapes shown in the FIG. 3, and other shapes, such as oval, round (e.g. the protrusion 234A), square, or any polygonal shapes (e.g. the protrusion 232A (FIG. 2B) may be generated. In accordance with an embodiment, the shape of a protrusion may be customized by users of the haptic feedback device 102 in accordance with their needs or preferences, as described for example, in FIG. 2B.

In certain scenarios, a user of the haptic feedback device 102 may not be able to use all the five fingers of a hand while touching the haptic feedback interface 110. This may be due to one or more missing fingers, restricted movement as a result of injury in one or more fingers, an ailment, some bone fracture, or pain. In such cases, the haptic feedback controller 220 may be configured to automatically detect such impairments or restricted movement of the five fingers of the hand when the hand is placed on the haptic feedback interface 110. In some embodiment, the integrated sensors of the sensor cluster unit 216 may be used to detect such impairments or restricted movement of the five fingers. The haptic feedback controller 220 may be configured to determine a haptic feedback to be generated on the haptic feedback interface 110 in accordance with the detected impairment. For example, the area on which the plurality of different haptic cues is generated may be reduced or modified to suit the detected impairment. The automatic detection of the impairments may be done when the haptic feedback device 102 is set in auto-mode. In some embodiments, the user 108 may switch to manual mode, where the user 108 may provide input via the haptic feedback interface 110 to indicate a specific impairment, and configure the generation of the plurality of different haptic cues based on the provided input that indicates a particular impairment. In some embodiments, the functions of the control buttons, the haptic feedback interface 110, and the haptic feedback device 102 may be configurable by the user 108 based on user inputs in a configuration mode. The configuration mode may be switched "ON" using a configure button (not shown) provided in the haptic feedback device 102.

In accordance with an embodiment, the user 108 may want to experience the ongoing sports event captured from the second viewing angle. In such a scenario, via the mode selector 112, the user 108 may provide the second user input to change the selection of the first image-capture device 104A to the second image-capture device 104B. In such a scenario, the above-described operations performed by the haptic feedback device 102 for the first video 114A are performed for the second video 114B, and the haptic feedback controller 220 may be configured to switch from the current scene of the first video 114A to selectively reproduce on the haptic feedback interface 110 a current scene of the second video 114B captured by the selected second image-capture device 104B. Thus, the haptic feedback interface 110 starts rendering various scenes of the second video 114B to enable the user 108 to non-visually discern the second video 114B on the haptic feedback device 102.

FIG. 4 illustrates a second exemplary scenario for implementation of the exemplary haptic feedback device of FIG. 2A for providing haptic sensation, in accordance with an embodiment of the disclosure. FIG. 4 is described in conjunction with elements from FIGS. 1, 2A, 2B, and 3. With reference to FIG. 4, there is shown a second exemplary scenario 400 that depicts generation of a plurality of haptic cues, such as a first haptic cue 402A, a second haptic cue 404A, a third haptic cue 406A, and a fourth haptic cue 408A on the haptic feedback interface 110 of the haptic feedback device 102. There is also shown the plurality of haptic elements 218, the mode selector 112, the microphone 316, and the biometric sensor 216A. FIG. 4 also illustrates various elements as described in the foregoing description of FIGS. 1, 2A, 2B, and 3.

In accordance with the second exemplary scenario 400, the user 108, who is visually impaired, may be travelling in a vehicle 410 and may want to experience an outside scene (e.g., the real time or near-real time event) of the vehicle 410 as visible from a display window (e.g., any of a left-side front display window, a right-side front display window, a left-side rear display window, a right-side rear display window, a front windshield, or a rear windshield) of the vehicle 410. The haptic feedback device 102 may be configured to receive the first video 114A from the first image-capture device 104A and the second video 114B from the second image-capture device 104B. In an example, the first image-capture device 104A may have a field of view to capture the first video 114A of the outside scene as visible from a first display window (e.g., a front windshield) of the vehicle 410 and the second image-capture device 104B may have a different field of view to capture the second video 114B of the outside scene as visible from a second display window (e.g., any of a left-side front display window, a right-side front display window, a left-side rear display window, a right-side rear display window, or a rear windshield) of the vehicle 410.

The user 108 may then select using the mode selector 112 one of the plurality of image-capture devices 104 to view an outside scene of the vehicle 410 as visible from a specific display window. In a non-limiting example, it is assumed that using the mode selector 112, the user 108 may select the first image-capture device 104A to experience the outside scene as visible from the first display window (e.g., the front windshield) of the vehicle 410.

In accordance with an embodiment, the network interface 208 may be configured to access the first look-ahead buffer 308A of the upcoming scene (such as the second scene 306) of the first video 114A when a current scene (such as the first scene 304) of the first video 114A is being rendered on the haptic feedback interface 110. The second segment 302B of the first video 114A that corresponds to the upcoming scene (such as the second scene 306) may be received (or retrieved) in real time or near-real time from the first image-capture device 104A, via the communication network 106.

The processing circuitry 210 of the haptic feedback device 102 may be configured to detect a plurality of different objects in the upcoming scene of the first video 114A based on the first look-ahead buffer 308A of the upcoming scene (such as the second scene 306) of the first video 114A. For example, in this case, the detected plurality of objects in the upcoming scene may be a road, a car, a cloud, and a pedestrian walking on a footpath. The processing circuitry 210 may be further configured to identity an object-type of each of the plurality of objects in the upcoming scene of the first video 114A based the first look-ahead buffer 308A of the first video 114A. For example, in this case, the object-type in the upcoming scene (such as the second scene 306) may be identified as a road, a human, a vehicle, and a cloud.

In a scenario, when the vehicle 410 is moving, any object outside the vehicle 410 is also perceived to be moving by any passenger inside the vehicle 410. The processing circuitry 210 may be further configured to detect the plurality of different motion associated with the plurality of objects in the upcoming scene of the first video 114A based on the first look-ahead buffer 308A of the first video 114A. Both intra-motion and inter-motion associated with the plurality of objects may be detected.

In accordance with an embodiment, the processing circuitry 210 may be configured to determine a relative position and height of each of plurality of objects with respect to each other. For example, it may be detected that the pedestrian is closer to the vehicle 410 as compared to the car. Thus, different motion, relative position, and height of each object may be determined for later use during determination of a haptic feedback to be generated on the haptic feedback interface 110. Further, the processing circuitry 210 may be configured to determine the speed and the direction of travel of each of the moving objects (such as the car, the road, the cloud, and the pedestrian) of the plurality of objects. For example, the car may seem to be moving away from the vehicle 410 and the pedestrian may seem to be moving towards the vehicle 410.

The haptic feedback controller 220 may be configured to determine a haptic feedback for the upcoming scene (such as the second scene 306) of the first video 114A based on the first look-ahead buffer 308A of the first video 114A and the detected plurality of different motion associated with the plurality of objects. The haptic feedback controller 220 may be configured to determine a scaling factor based on an aspect ratio of the first video 114A and a defined haptic output area of the haptic feedback interface 110. The defined haptic output area may refer to a spatial area of the haptic feedback interface 110 on which the determined haptic feedback is to be generated. The scaling factor may be utilized to map the detected plurality of objects to the plurality of haptic elements 218 of the haptic feedback interface 110.

The haptic feedback generator 222 may be configured to generate the plurality of different haptic cues (such as the first haptic cue 402A, the second haptic cue 404A, the third haptic cue 406A, and the fourth haptic cue 408A) on the haptic feedback interface 110 using the plurality of haptic elements 218, based on the determined haptic feedback for the first video 114A. In some embodiments, the plurality of different haptic cues may include one or more movable haptic cues, such as the first haptic cue 402A, the second haptic cue 404A, the third haptic cue 406A, and the fourth haptic cue 408A in this case. The first haptic cue 402A may correspond to the road and the second haptic cue 404A may correspond to the car. The third haptic cue 406A may correspond to the cloud in the sky and the fourth haptic cue 408A may correspond to the pedestrian.

The haptic feedback generator 222 may be configured to generate the one or more movable haptic cues on the haptic feedback interface 110 using the plurality of haptic elements 218 in synchronization with the current scene of the first video 114A, based on the determined haptic feedback. The one or more movable haptic cues may be generated on the haptic feedback interface 110 at a time instant when the second scene 306 is rendered as the current scene on the haptic feedback interface 110. Thus, the generated plurality of different haptic cues (such as the first haptic cue 402A, the second haptic cue 404A, the third haptic cue 406A, and the fourth haptic cue 408A) on the haptic feedback interface 110 may be constantly synchronized with the current scene rendered on the haptic feedback interface 110. The plurality of different haptic cues (such as the first haptic cue 402A, the second haptic cue 404A, the third haptic cue 406A, and the fourth haptic cue 408A) may be generated by a touch-discernible modality, for example, a differential pressure-based modality, a differential temperature-based modality, a differential electric pulse-based modality, a differential raised shape pattern-based modality, or a combination of different touch-discernible modalities.

In accordance with an embodiment, the haptic feedback generator 222 may be configured to control a relative positioning of the plurality of different haptic cues on the haptic feedback interface 110 to selectively reproduce the current scene (such as the second scene 306) of the first video 114A. The selective reproduction of the current scene (i.e., the second scene 306) may correspond to removal of one or more irrelevant objects detected in the first video 114A. For example, pot-holes on the road may be assigned the least interest quotient among other objects of the plurality of objects. The objects, for which the predicted interest quotient is below a defined threshold value, may be considered as irrelevant. Removal of irrelevant objects detected in the first look-ahead buffer 308A of the first video 114A for selective reproduction of the current scene (i.e., the second scene 306), may significantly save the processing time and battery power consumption for the generation of the plurality of different haptic cues on the haptic feedback interface 110.

In accordance with an embodiment, the haptic feedback generator 222 may be configured to control deformation of a haptic cue, such as the fourth haptic cue 408A, on the haptic feedback interface 110 such that an inter-movement or an intra-movement of an object may be discernible by tactioception. For example, the fourth haptic cue 408B may be a movable haptic cue generated as a protrusion of a human-like shape-pattern extending from the haptic feedback interface 110. The one or more motion from the detected plurality of different motion associated with the pedestrian in the upcoming scene of the first video 114A may be discernible based on a movement of the deformation of the fourth haptic cue 408A on the haptic feedback interface 110. A fifth haptic cue 408B is an example of the deformation of the fourth haptic cue 408A to non-visually discern the inter-movement of the pedestrian. In this case, the height of the fifth haptic cue 408B is increased in comparison to the fourth haptic cue 408A indicating that the pedestrian is moving closer to the vehicle 410.

In accordance with an embodiment, the haptic feedback generator 222 may be configured to control movement of the one or more movable haptic cues on the haptic feedback interface 110 such that an inter-movement among a set of moving objects of the plurality of objects, which may be discernible by tactioception. In some embodiments, a rate-of-change of movement of the one or more movable haptic cues may be further controlled in accordance with the determined scaling factor.

In conventional devices, the input section to receive a haptic input is different from the output section (in a conventional haptic user interface) where the Braille output or other tactile forms of output are generated. Typically, the input section to receive haptic input is a 6-keys or 8-keys Braille input. A separate section to receive input and provide output, may be considered a rudimentary form of HMI, where a generated haptic output may not be capable of receive a further feedback on a particular touch-discernible haptic cue. In contrast, the same tactile surface area of the haptic feedback interface 110 of the haptic feedback device 102 acts both as the haptic input receiver and haptic output generator, where the user 108 may press or push a protrusion (or a bulge) generated on the haptic feedback interface 110 to provide the haptic input related to a specific object. Such an implementation makes the haptic feedback device 102 more compact in size and increases the ease of operation for a non-sighted person. Based on the amount of pressure or force exerted by the user 108 while touching the protrusion or pushing the protrusion on the haptic feedback interface 110, the press or push may be considered a haptic input by the haptic feedback controller 220.

In a scenario where the user 108 may want to experience the outside scene as visible from a different display window, the user 108 may provide the second user input to change the selection of the first image-capture device 104A to the second image-capture device 104B using the mode selector 112. In an example, the user 108 may turn the head towards right and the mode selector 112 may recognize the head turning as the second user input and may select the second image-capture device 104B capturing the outside scene as visible from the right-side rear display window. In such a scenario, the above-described operations performed by the haptic feedback device 102 for the first video 114A are then performed for the second video 114B, and the haptic feedback controller 220 may be configured to switch from the current scene of the first video 114A to selectively reproduce on the haptic feedback interface 110 a current scene of the second video 114B captured by the selected second image-capture device 104B. Thus, the haptic feedback interface 110 renders scenes of the second video 114B to enable the user 108 to non-visually discern the second video 114B on the haptic feedback device 102.

Figure 5A:
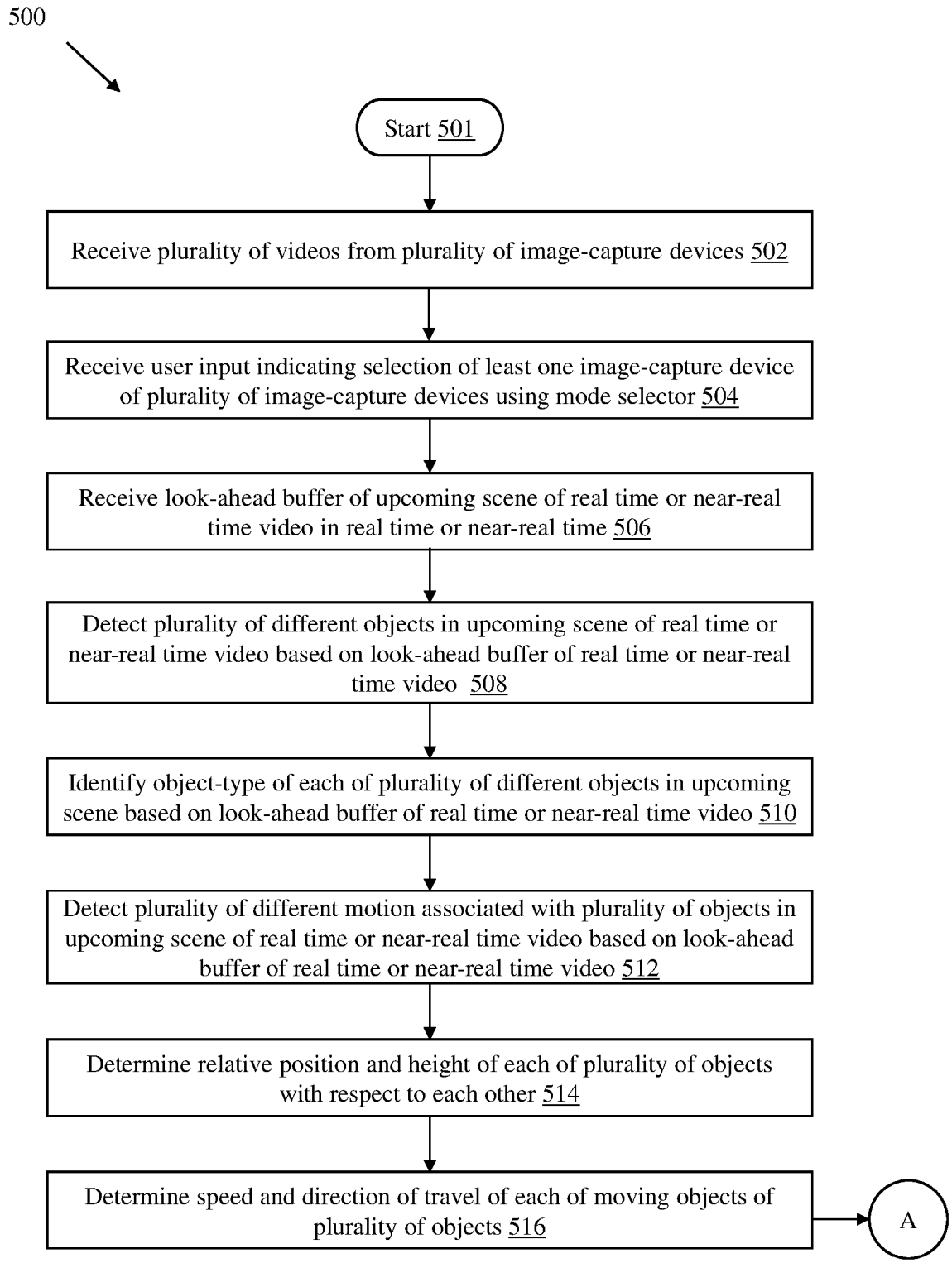
FIGS. 5A, 5B, and 5C collectively, depict a flow chart that illustrates a method for providing haptic sensation, in accordance with an embodiment of the disclosure.
Figure 5B:
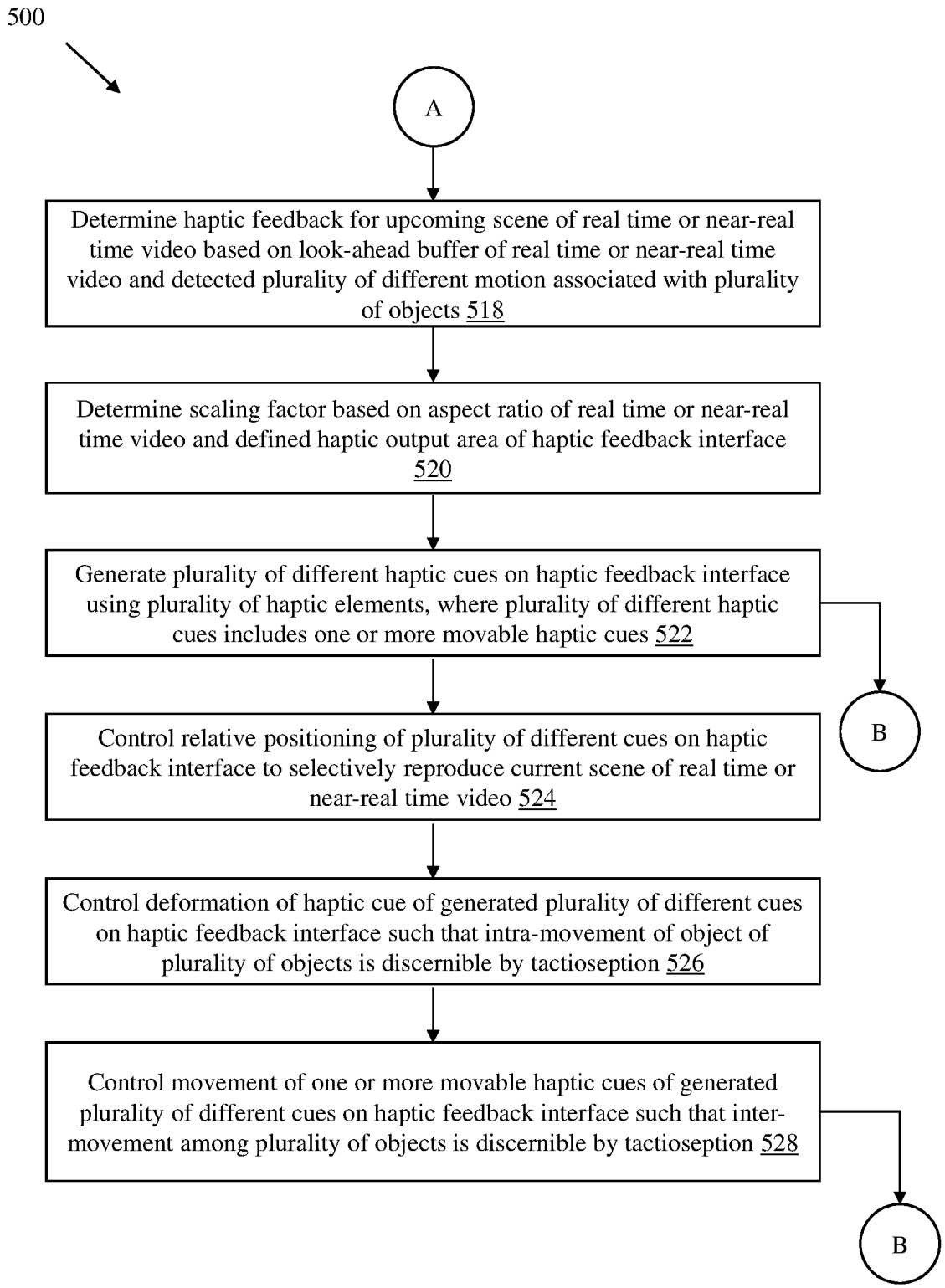
Figure 5C:
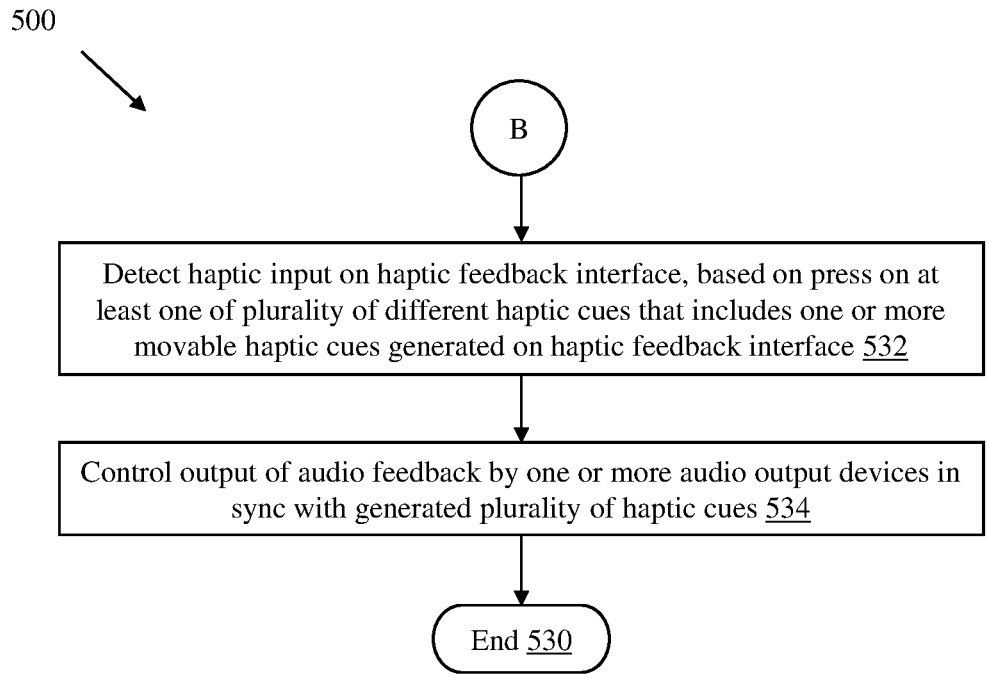

FIGS. 5A, 5B, and 5C collectively, depict a flow chart that illustrates a method for providing haptic sensation, in accordance with an embodiment of the disclosure. FIGS. 5A, 5B, and 5C are described in conjunction with elements from the FIGS. 1, 2A, 2B, 3, and 4. As shown in FIG. 5A, the method of the flow chart 500 starts at 501 and proceeds to 502.

At 502, a plurality of videos from a plurality of image-capture devices are received. The processing circuitry 210 may be configured to receive the plurality of videos (e.g., the first video 114A and the second video 114B) from the plurality of image-capture devices 104. The plurality of image-capture devices 104 has different field-of-views and captures the plurality of videos to record a real time or near-real time event in the 3D real-world area 116 from different viewing angles.

At 504, a user input is received indicating a selection of at least one of the plurality of image-capture devices 104. The processing circuitry 210 may be configured to receive the user input via the mode selector 112 indicating a selection of at least one of the plurality of image-capture devices 104. The haptic feedback controller 220 may be configured to detect a change or a selection of an image-capture device when the user 108 selects or changes a selection using the mode selector 112.

At 506, a look-ahead buffer of an upcoming scene of a real time or near-real time video (e.g., the first video 114A or the second video 114B) may be received. The network interface 208 may be configured to receive the look-ahead buffer of the upcoming scene of the real time or near-real time video in real time or near-real time from the selected image-capture device of the plurality of image-capture devices 104.

At 508, a plurality of different objects in the upcoming scene of the real time or near-real time video may be detected based on the look-ahead buffer of the real time or near-real time video. The processing circuitry 210 may be configured to detect the plurality of different objects in the upcoming scene of the real time or near-real time video.

At 510, an object-type of each of the plurality of objects in the upcoming scene of the real time or near-real time video may be identified based the look-ahead buffer of the real time or near-real time video. The processing circuitry 210 may be configured to identify the object-type of each of the plurality of objects in the upcoming scene of the real time or near-real time video. Examples of the object-type may include, but are not limited to a human being, an animal, a virtual character, a famous personality, a point-of-interest, a vehicle-type (such as a car, a truck, a bicycle, a two-wheeler, a four-wheeler, and the like), a living object, a non-living object, a moving object, a stationary object, and other objects in the real time or near-real time video.

At 512, a plurality of different motion associated with the plurality of objects in the upcoming scene of the real time or near-real time video may be detected. The processing circuitry 210 may be configured to detect the plurality of different motion associated with the plurality of objects in the upcoming scene of the real time or near-real time video based on the look-ahead buffer of the real time or near-real time video. For example, both intra-motion and inter-motion associated with the plurality of objects may be detected. The intra-motion of an object refers to movement within the object, such as movement of different parts of an object while the object is standing or located at a particular place. The inter-motion refers to movement of objects with respect to each other.

At 514, a relative position and height of each of plurality of objects with respect to each other may be determined. The processing circuitry 210 may be configured to determine the relative position and height of each of plurality of objects with respect to each other.

At 516, a speed and a direction of travel of each of the moving objects of the plurality of objects may be determined. The processing circuitry 210 may be configured to determine the speed and the direction of travel of each of the moving objects of the plurality of objects.

At 518, a haptic feedback for the upcoming scene of the real time or near-real time video may be determined based on the look-ahead buffer of the real time or near-real time video and the detected plurality of different motion associated with the plurality of objects.

At 520, a scaling factor may be determined based on an aspect ratio of the real time or near-real time video and defined haptic output area of the haptic feedback interface 110. The processing circuitry 210 may be configured to determine the scaling factor based on the aspect ratio of the real time or near-real time video and defined haptic output area of the haptic feedback interface 110.

At 522, a plurality of different haptic cues may be generated on the haptic feedback interface 110 using the plurality of haptic elements 218, based on the determined haptic feedback. In some embodiments, the plurality of different haptic cues may include one or more one or more movable haptic cues. The haptic feedback generator 222 may be configured to generate the one or more movable haptic cues on the haptic feedback interface 110 using the plurality of haptic elements 218 in synchronization with a current scene of the real time or near-real time video, based on the determined haptic feedback. The plurality of different haptic cues may be generated by a touch-discernible modality. The touch-discernible modality may include at least one of a differential pressure-based modality, a differential temperature-based modality, a differential electric pulse-based modality, a differential raised shape pattern-based modality, or a combination of different touch-discernible modalities. The control may pass to 524 or 536.

In accordance with an embodiment, the processing circuitry 210 may be configured to select a first touch-discernible modality from a plurality of touch-discernible modalities to generate a plurality of different haptic cues on the haptic feedback interface 110. The selection of the first touch-discernible modality may be based on learned user interaction information. The learned user interaction information may be determined based on a historical analysis of usage pattern data of the haptic feedback interface 110 by the learning engine provided in the memory 212. In some embodiments, a combination of different touch-discernible modalities may be selected based on the learned user interaction information and a specified user-setting.

In a first example, the selected touch-discernible modality from the plurality of touch-discernible modalities to generate a plurality of different haptic cues on the haptic feedback interface 110, may correspond to a differential pressure-based modality. The plurality of different haptic cues may be generated as multi-level pressure or different amount of pressure on the haptic feedback interface 110 by the haptic feedback generator 222. For example, a first object of the plurality of objects in the first video 114A may be discernible by generating a haptic signal through one or more haptic elements of the plurality of haptic elements 218 as a first amount of pressure. This first amount of pressure may be felt by the user 108 when the user 108 touches a specific portion, for example, a first portion, of the haptic feedback interface 110. Similarly, for each position of different objects of the plurality of objects, a different amount of pressure may be generated on the haptic feedback interface 110. Thus, the user 108 may feel different amount of pressure at different points (or portions) on the haptic feedback interface 110. The different amount of pressure enables the user 108 (by touch on the haptic feedback interface 110) to non-visually discern the relative positioning of the plurality of objects in the first video 114A (or the second video 114B). The different amount of pressure may correspond to the plurality of different haptic cues generated as multi-level pressure.

In a second example, the selected touch-discernible modality from the plurality of touch-discernible modalities to generate a plurality of different haptic cues on the haptic feedback interface 110, may correspond to a differential temperature-based modality. In accordance with an embodiment, the plurality of different haptic cues may be generated as different temperatures, for example, different combination of hot and cold temperatures, on the haptic feedback interface 110 by the haptic feedback generator 222. For each position of different objects of the plurality of objects, a different temperature level may be generated on the haptic feedback interface 110 through one or more haptic elements of the plurality of haptic elements 218. The different level of temperature may enable the user 108 (by touch on the haptic feedback interface 110 to non-visually discern the relative positioning of the plurality of objects including the user 108 in a video (such as the first video 114A or the second video 114B).

In a third example, the selected touch-discernible modality from the plurality of touch-discernible modalities to generate a plurality of different haptic cues on the haptic feedback interface 110, may correspond to a differential electric pulse-based modality. In this case, the plurality of different haptic cues may be generated as different level of electric-pulses on the haptic feedback interface 110 by the haptic feedback generator 222. For each position of different objects of the plurality of objects, a different level of electric-pulse may be generated on the haptic feedback interface 110 through a haptic element of the plurality of haptic elements 218. The different level of electric-pulses may enable the user 108 (by touch sense on the haptic feedback interface 110) to non-visually discern the relative positioning of the plurality of objects in a real time or near-real time video (such as the videos 114A and 114B). The different amount of electric-pulses may correspond to the plurality of different haptic cues generated as different level of electric-pulses. Further, when an object of the plurality of objects moves in the real time or near-real time video, an electric-pulse may also be felt on the haptic feedback interface 110 to be moving as a continuous line from one point of the haptic feedback interface 110 to another point to represent the movement and a direction of movement of the object in the real time or near-real time video. The generation of electric-pulse (i.e. a touch-discernible cue) along a certain path on the haptic feedback interface 110 may be synchronized to the actual movement of the object in the real time or near-real time video. This allows the user 108 to understand the path of movement of the object via the haptic feedback interface 110. In accordance with an embodiment, the synchronization of the generation of electric-pulse (i.e. a touch-discernible cue) along a certain path on the haptic feedback interface 110 may be controlled based on the determined scaling factor.

In a fourth example, the selected touch-discernible modality from the plurality of touch-discernible modalities to generate a plurality of different haptic cues on the haptic feedback interface 110, may correspond to a differential raised shape pattern-based modality. In this case, the plurality of different haptic cues may be generated as a plurality of protrusions of different shapes that are extended from the surface of the haptic feedback interface 110. The plurality of protrusions of different shape, are shown, for example, in FIGS. 2B, 3, and 4, as the plurality of different haptic cues. Each protrusion may be a raised shape-pattern or a bulge that sticks out from at least one or a group of haptic elements of the plurality of haptic elements 218 of the haptic feedback interface 110. The plurality of protrusions represents the plurality of objects in the real time or near-real time video (e.g., the first video 114A or the second video 114B). One shape may be assigned to one identified object-type of the plurality of objects of the first video 114A (or the second video 114B) to enable the user 108 to discern the object-type when the user 108 touches a protrusion or depression of a defined shape. Thus, similar to the sighted people who use information about the features on the surface of an object, like color, shading, or overall size, and shape, to recognize an object, the people who have lost the sense of sight may also have the capability to identify an object based on a touch on the protrusion of a defined shape, where an association of a particular shape with a particular object-type is learned by brain.

In accordance with an embodiment, the plurality of protrusions generated on the haptic feedback interface 110 enables the user 108 to discern not only the object-type but also a relative positioning of the plurality of objects and movement of one or more of the plurality of objects in the real time or near-real time video. In accordance with an embodiment, the plurality of protrusions or depressions may be of the same shapes. In such a case, although it may be relatively difficult to identify an object-type, however, the relative position and movement (if any) of each of the plurality of objects in the real time or near-real time video may be easily discernible by touch on the plurality of protrusions. Further, as the user 108 may hear sound emanated from the haptic feedback device 102, the user 108 may correlate the plurality of protrusions with the plurality of sounds to discern an object-type, and an action or movement with respect to the plurality of objects. The haptic feedback generator 222 may be configured to control the extending and the retracting of the plurality of protrusions or depressions by use of the plurality of haptic elements 218.

In accordance with an embodiment, the haptic feedback generator 222 may be configured to control the grouping of the plurality of haptic elements 218 during extension or depression to represent a particular shape for a protrusion or depression. In accordance with an embodiment, the protrusion or the depression may be static or may be deformable. The same protrusion may have different meanings based on the deformation. An example of the deformation of the same protrusion (such as the protrusion 230A to protrusions 230B, 230C, 230D, or 230E) is shown and described, for example, in FIG. 2B. In accordance with an embodiment, the plurality of protrusions may be generated by application of different temperatures on different surface area of the haptic feedback interface 110. In such an embodiment, the haptic feedback interface 110 may include a covering on the haptic feedback interface 110. The covering may be a polymer-based layer sensitive to temperature. The plurality of haptic elements 218 may be arranged as the array of cylindrical tubes below the covering. In cases where, a localized high temperature is generated through one or a group of the haptic elements of the plurality of haptic elements 218, a bulge may appear on the covering of the haptic feedback interface 110. Similarly, different bulge portions may represent the plurality of protrusions. In cases where, a localized low temperature is generated through one or a group of the haptic elements of the plurality of haptic elements 218, the bulge may disappear or subside or a depression may appear on the covering of the haptic feedback interface 110. Similarly, different bulge portions or concavities (or depressions) may represent the plurality of protrusions or depressions. Notwithstanding, the plurality of protrusions and depressions may be generated by various methods, such as by electro-chemical process, electro-mechanical process, without limiting the scope of the disclosure. In accordance with an embodiment, the plurality of different haptic cues may be generated as different level of electric-pulses or a different amount of pressure, such as pain points (or pricking points) that may represent the positioning or movement of the plurality of objects in the real time or near-real time video.

At 524, a relative positioning of the plurality of different haptic cues on the haptic feedback interface 110 may be controlled to selectively reproduce the current scene of the real time or near-real time video. The haptic feedback controller 220 in association with the haptic feedback generator 222 may be configured to control the relative positioning of the plurality of different haptic cues on the haptic feedback interface 110.

At 526, a deformation of a haptic cue of the generated plurality of different haptic cues on the haptic feedback interface 110 may be controlled such that an intra-movement of an object of the plurality of objects may be discernible by tactioception. The haptic feedback controller 220 in association with the haptic feedback generator 222 may be configured to control deformation of one or more haptic cues of the generated plurality of different haptic cues on the haptic feedback interface 110 such that intra-movements of one or more objects of the plurality of objects may be discernible by tactioception.

At 528, the movement of the one or more movable haptic cues of the generated plurality of different haptic cues may be controlled on the haptic feedback interface 110 such that an inter-movement among the plurality of objects may be discernible by tactioception. The haptic feedback generator 222 may be configured to control the movement of the one or more movable haptic cues of the generated plurality of different haptic cues. In some embodiments, a rate-of-change of movement of the one or more movable haptic cues may be further controlled in accordance with the determined scaling factor. The control may pass to end 530 or 532.

At 532, a haptic input may be detected on the haptic feedback interface 110, based on a press or a push on at least one of the generated plurality of different haptic cues that includes the one or more movable haptic cues generated on the haptic feedback interface 110. The haptic feedback controller 220 may be configured to detect the haptic input on the haptic feedback interface 110.

At 534, output of an audio feedback by one or more audio output devices may be controlled to be in sync with the generated plurality of haptic cues. The control passes to 530.

In accordance with an exemplary aspect of the disclosure, a system for providing haptic sensation based on real time or near-real time video is disclosed. The system may include the haptic feedback device 102 (FIGS. 1, 2A, 2B, 3, and 4), which may comprise the haptic feedback interface 110 (FIG. 1) comprising the plurality of haptic elements 218 (FIG. 2A). The haptic feedback device 102 may further comprise the processing circuitry 210 configured to receive a plurality of videos from the plurality of image-capture devices 104. The plurality of image-capture devices 104 has different field-of-views and captures the plurality of videos to record a real time or near-real time event in the 3D real-world area 116 from different viewing angles. The processing circuitry 210 may be configured to receive a first user input that indicates a selection of a first image-capture device (e.g., the first image-capture device 104A or the second image-capture device 104B) from the plurality of image-capture devices 104. The selected first image-capture device captures a first video (e.g., the first video 114A or the second video 114B) of the plurality of videos. The processing circuitry 210 may be configured to detect a plurality of different motion associated with a plurality of objects in an upcoming scene of the first video (e.g., the first video 114A or the second video 114B) based on a look-ahead buffer (e.g., the first look-ahead buffer 308A or the second look-ahead buffer 308B) of the first video. The haptic feedback device 102 may further comprise the haptic feedback controller 220 configured to determine a haptic feedback for the upcoming scene of the real time or near-real time video based on the look-ahead buffer of the first video and the detected plurality of different motion associated with the plurality of objects. The haptic feedback device 102 may further comprise the haptic feedback generator 222 configured to generate one or more movable haptic cues on the haptic feedback interface 110 using the plurality of haptic elements 218 in synchronization with a current scene of the first video, based on the determined haptic feedback.

The present disclosure may be realized in hardware, or a combination of hardware and software. The present disclosure may be realized in a centralized fashion, in at least one computer system, or in a distributed fashion, where different elements may be spread across several interconnected computer systems or the special-purpose device. A computer system or other special-purpose apparatus adapted to carry out the methods described herein may be suited. The present disclosure may be realized in hardware that comprises a portion of an integrated circuit that also performs other functions.

The present disclosure may also be embedded in a computer program product, which comprises all the features that enable the implementation of the methods described herein, and which, when loaded in a special-purpose machine or computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without deviation from the scope of the present disclosure. In addition, many modifications may be made to adapt a particular situation or material to the teachings of the present disclosure without deviation from its scope. Therefore, it is intended that the present disclosure not be limited to the particular embodiment disclosed, but that the present disclosure will include all embodiments falling within the scope of the appended claims.

What is claimed is:

1. A haptic feedback device for providing haptic sensation, comprising:
a haptic feedback interface that comprises a plurality of haptic elements;
a processing circuitry configured to:
receive a plurality of videos from a plurality of image-capture devices, wherein the plurality of image-capture devices has different field-of-views and captures the plurality of videos to record a real time or near-real time event in a three-dimensional (3D) real-world area from different viewing angles;
receive a first user input via a mode selector in form of at least one of a gesture or a physical touch input on the mode selector, to indicate a selection of a first image-capture device from the plurality of image-capture devices, wherein the selected first image-capture device captures a first video of the plurality of videos, the first video of the real time or near-real time event from a specific viewing angle that a user prefers to experience;
receive a look-ahead buffer of an upcoming scene of a real time or near-real time of the first video;
detect a plurality of different motion associated with a plurality of objects in the upcoming scene based on the look-ahead buffer of the upcoming scene; and
a haptic feedback generator configured to:
determine a haptic feedback for the upcoming scene of the first video based on the look-ahead buffer of the first video and the detected plurality of different motion associated with the plurality of objects;
generate a plurality of different haptic cues that includes one or more movable haptic cues, based on the determined haptic feedback; and
control movement of the one or more movable haptic cues generated on the haptic feedback interface such that an inter-movement among the plurality of objects is discernible by tactioception.

2. The haptic feedback device according to claim 1, wherein the processing circuitry is further configured to detect a plurality of different objects in the upcoming scene of the first video, based on the look-ahead buffer of the first video.

3. The haptic feedback device according to claim 1, wherein the real time or near-real time event corresponds to an ongoing sports event.

4. The haptic feedback device according to claim 1, wherein the real time or near-real time event corresponds to an outside scene of a vehicle and each image-capture device of the plurality of image-capture devices captures the outside scene as visible from different display windows of the vehicle.

5. The haptic feedback device according to claim 4, wherein the different display windows of the vehicle include a left-side front display window, a right-side front display window, a left-side rear display window, a right-side rear display window, a front windshield, or a rear windshield.

6. The haptic feedback device according to claim 1, wherein the mode selector is configured to recognize a gesture of a user as the first user input for selecting the first image-capture device.

7. The haptic feedback device according to claim 1, wherein the haptic feedback generator is further configured to selectively reproduce on the haptic feedback interface, a current scene of the first video captured by the selected first image-capture device.

8. The haptic feedback device according to claim 1, wherein the processing circuitry is further configured to receive, after the first user input, a second user input that indicates a selection of a second image-capture device from the plurality of image-capture devices, wherein the selected second image-capture device captures a second video of the plurality of videos.

9. The haptic feedback device according to claim 8, wherein the haptic feedback generator is further configured to switch from a current scene of the first video to selectively reproduce on the haptic feedback interface a current scene of the second video captured by the selected second image-capture device based on the second user input.

10. The haptic feedback device according to claim 9, wherein the one or more movable haptic cues are generated on the haptic feedback interface using the plurality of haptic elements in synchronization with the current scene of the first video.

11. The haptic feedback device according to claim 10, wherein the haptic feedback generator is further configured to control a relative positioning of the plurality of different haptic cues on the haptic feedback interface to selectively reproduce the current scene of the first video on the haptic feedback interface.

12. The haptic feedback device according to claim 11, wherein the haptic feedback generator is further configured to control deformation of a haptic cue of the generated plurality of different haptic cues on the haptic feedback interface such that an intra-movement of an object of the plurality of objects is discernible by the tactioception.

13. The haptic feedback device according to claim 1, further comprising a network interface to receive the look-ahead buffer of the upcoming scene of the first video in real time or near-real time from the first image-capture device communicatively coupled to the haptic feedback device.

14. The haptic feedback device according to claim 1, wherein the processing circuitry is further configured to identify an object-type of each of the plurality of objects in the upcoming scene based on the look-ahead buffer of the first video.

15. A method for providing haptic sensation, comprising:
in a haptic feedback device that comprises at least a haptic feedback interface that includes a plurality of haptic elements:
receiving a plurality of videos from a plurality of image-capture devices, wherein the plurality of image-capture devices has different field-of-views and captures the plurality of videos to record a real time or near-real time event in a three-dimensional (3D) real-world area from different viewing angles;
receiving a first user input via a mode selector in form of at least one of a gesture or a physical touch input on the mode selector, to indicate a selection of a first image-capture device from the plurality of image-capture devices, wherein the selected first image-capture device captures a first video of the plurality of videos, the first video of the real time or near-real time event from a specific viewing angle that a user prefers to experience;
detecting a plurality of different motion associated with a plurality of objects in an upcoming scene of the first video based on a look-ahead buffer of the first video;
determining a haptic feedback for the upcoming scene of the first video based on the look-ahead buffer of the first video and the detected plurality of different motion associated with the plurality of objects;
generating a plurality of different haptic cues that includes one or more movable haptic cues based on the determined haptic feedback; and
controlling movement of the one or more movable haptic cues generated on the haptic feedback interface such that an inter-movement among the plurality of objects is discernible by tactioception.

16. The method according to claim 15, further comprising detecting a plurality of different objects in the upcoming scene of the first video, based on the look-ahead buffer of the first video.

17. The method according to claim 15, wherein the real time or near-real time event corresponds to an ongoing sports event.

18. The method according to claim 15, wherein the real time or near-real time event corresponds to an outside scene of a vehicle and each image-capture device of the plurality of image-capture devices captures the outside scene as visible from different display windows of the vehicle.

19. The method according to claim 15, further comprising receiving after the first user input, a second user input that indicates a selection of a second image-capture device from the plurality of image-capture devices, wherein the selected second image-capture device captures a second video of the plurality of videos.

20. The method according to claim 19, further comprising switching from a current scene of the first video to selectively reproduce on the haptic feedback interface a current scene of the second video captured by the selected second image-capture device based on the second user input.

* * * * *